(12) United States Patent
Ishida et al.

(10) Patent No.: US 9,033,127 B2
(45) Date of Patent: May 19, 2015

(54) MOTORCYCLE INCLUDING CENTRIFUGAL CLUTCH

(71) Applicant: YAMAHA HATSUDOKI KABUSHIKI KAISHA, Shizuoka-ken (JP)

(72) Inventors: Yousuke Ishida, Shizuoka-ken (JP); Toshinori Inomori, Shizuoka-ken (JP)

(73) Assignee: YAMAHA HATSUDOKI KABUSHIKI KAISHA, Shizuoka-ken (JP)

( * ) Notice: Subject to any disclaimer, the term of this patent is extended or adjusted under 35 U.S.C. 154(b) by 263 days.

(21) Appl. No.: 13/845,043

(22) Filed: Mar. 17, 2013

(65) Prior Publication Data

US 2013/0270058 A1 Oct. 17, 2013

(30) Foreign Application Priority Data

Apr. 17, 2012 (JP) ................................. 2012-094115

(51) Int. Cl.
*F16D 43/08* (2006.01)
*F16D 43/12* (2006.01)

(52) U.S. Cl.
CPC ................ *F16D 43/08* (2013.01); *F16D 43/12* (2013.01)

(58) Field of Classification Search
CPC ...................... F16D 43/06; F16D 43/08–43/12
See application file for complete search history.

(56) References Cited

U.S. PATENT DOCUMENTS 8,695,775 B2* 4/2014 Inomori et al. ........... 192/103 A
2009/0211868 A1 8/2009 Inomori et al.

FOREIGN PATENT DOCUMENTS

| EP | 2 022 998 A2 | 2/2009 |
| EP | 2 093 449 A2 | 8/2009 |
| EP | 2653743 A1 * | 10/2013 |
| JP | 2009-197990 A | 9/2009 |

OTHER PUBLICATIONS

European search report issued on Jul. 23, 2013.

* cited by examiner

*Primary Examiner* — Jacob S Scott
(74) *Attorney, Agent, or Firm* — Rabin & Berdo, P.C.

(57) ABSTRACT

A centrifugal clutch is disclosed. The centrifugal clutch has a first plate provided in a clutch housing, a second plate provided in a clutch boss, a pressure plate capable of being moved close to and away from the first and second plates, and a centrifugal weight arranged to push the pressure plate toward the first and second plates by receiving centrifugal force. The centrifugal clutch is arranged so that torque T transmitted between the first and second plates is temporarily reduced and then increased as an engine rotational speed is increased from a time when an engine is stopped.

6 Claims, 19 Drawing Sheets

MOTORCYCLE INCLUDING CENTRIFUGAL CLUTCH

BACKGROUND OF THE INVENTION

1. Field of the Invention

The present invention relates to motorcycles including centrifugal clutches.

2. Description of the Related Art

A motorcycle includes a power transmission mechanism for transmitting power from an engine to a driving wheel. A motorcycle including a centrifugal clutch in a power transmission mechanism is conventionally known. A conventional centrifugal clutch is provided so as to be disengaged when an engine is stopped and engaged upon an increase in engine rotational speed. When the engine is stopped, the centrifugal clutch is disengaged and thus no engine brake is applied to a driving wheel. Therefore, when a motorcycle is parked on a hill, a parking brake is conventionally used to restrict the driving wheel so as to prevent rotation thereof.

In contrast to this, JP-A-2009-197990 discloses a motorcycle capable of being stably parked on a hill by merely engaging gears of a transmission without using a parking brake. A centrifugal clutch of the motorcycle disclosed in JP-A-2009-197990 includes a first plate, a second plate, a pressure plate that presses the first plate against the second plate, and a centrifugal weight that applies a pressing force to the pressure plate. When an engine is stopped, substantially no centrifugal force is exerted on the centrifugal weight, and thus no pressing force is applied to the pressure plate. Therefore, the centrifugal clutch is provided with an elastic body that presses the pressure plate toward the first plate so that the first plate presses the second plate with a certain degree of force even when the engine is stopped.

In the motorcycle disclosed in JP-A-2009-197990, when the engine is stopped, the pressure plate is pressed toward the first plate by the elastic body, and thus the first and second plates are pressed against each other. Therefore, even when the engine is stopped, the centrifugal clutch is engaged, and rotation of a driving wheel is restricted without the use of a parking brake.

FIG. 19 illustrates a characteristic curve of the centrifugal clutch. In FIG. 19, the horizontal axis represents an engine rotational speed r, and the vertical axis represents a transmission torque T of the centrifugal clutch. When the engine rotational speed is equal to or lower than ri, the transmission torque T of the centrifugal clutch is held at a constant value Ti.

In order to more reliably restrict rotation of the driving wheel when the engine is stopped, the transmission torque value Ti is preferably large. However, when the transmission torque value Ti is too large, an excessive load is applied to the engine during idling, which might cause the engine to stall. Even if occurrence of engine stalling is avoided, the large transmission torque value Ti causes a large driving force to be transmitted to the driving wheel when an accelerator is not operated (i.e., when a throttle valve is not opened), which might result in degradation in creeping performance of the motorcycle.

SUMMARY OF THE INVENTION

Accordingly, preferred embodiments of the present invention provide a motorcycle including a centrifugal clutch, capable of being stably parked on a hill without the use of a parking brake, less prone to engine stalling, and achieving favorable creeping performance.

A motorcycle according to a preferred embodiment of the present invention includes an engine, a driving wheel, a first power transmission mechanism connected to the engine, a second power transmission mechanism connected to the driving wheel, and a centrifugal clutch connected to the first and second power transmission mechanisms. The centrifugal clutch includes: a first rotator connected to the first power transmission mechanism; a second rotator connected to the second power transmission mechanism; a first plate that is provided in the first rotator and rotates together with the first rotator; a second plate that is provided in the second rotator so as to face the first plate and rotates together with the second rotator; a pressure plate located so as to face the first or second plate and capable of being moved close to and away from the first and second plates; and a centrifugal weight located opposite to locations of the first and second plates with respect to the pressure plate and arranged to push the pressure plate toward the first and second plates by receiving centrifugal force. The centrifugal clutch is arranged so that torque transmitted between the first and second plates is temporarily reduced and then increased as an engine rotational speed is increased from a time when the engine is stopped.

In the motorcycle according to the preferred embodiment of the present invention, transmission torque of the centrifugal clutch is temporarily reduced and then increased as the engine rotational speed is increased from the time when the engine is stopped. Therefore, even when the transmission torque during engine stoppage is set at a relatively high level, the transmission torque can be kept low during idling. Furthermore, the transmission torque can be kept low during creeping. Accordingly, the motorcycle can be stably parked on a hill without the use of a parking brake, engine stalling is unlikely to occur, and creeping performance can be favorably maintained.

According to a preferred embodiment of the present invention, the centrifugal clutch preferably further includes: a third plate located opposite to the locations of the first and second plates with respect to the pressure plate and supported by the first rotator; a fourth plate located between the third plate and the pressure plate; a cam member located between the third and fourth plates and including a cam surface arranged so that an interval between the cam surface and the fourth plate is increased as the cam surface extends inwardly in a radial direction of the fourth plate; and an elastic body that urges the cam member toward the pressure plate. The centrifugal weight is preferably located between the cam surface of the cam member and the fourth plate.

When the engine is stopped, the cam member presses the pressure plate by receiving a force from the elastic body, and the first and second plates are pressed against each other by the pressure plate. Upon increase of the engine rotational speed, the cam member goes away from the pressure plate by receiving a force from the centrifugal weight, and the force of the pressure plate by which the first and second plates are pressed against each other is decreased. Therefore, the torque transmitted between the first and second plates is reduced. Upon further increase of the engine rotational speed, the centrifugal weight presses the fourth plate toward the pressure plate. Then, the force of the pressure plate by which the first and second plates are pressed is increased, and the torque transmitted between the first and second plates is increased. Thus, the torque transmitted between the first and second plates is temporarily reduced and then increased as the engine rotational speed is increased from the time when the engine is stopped.

According to another preferred embodiment of the present invention, the centrifugal clutch preferably further includes: a third plate located opposite to the locations of the first and second plates with respect to the pressure plate and supported by the first rotator; a cam member located between the third plate and the pressure plate and including a cam surface arranged so that an interval between the cam surface and the third plate is increased as the cam surface extends inwardly in a radial direction of the third plate; and an elastic body that urges the cam member toward the third plate. An additional cam surface is preferably provided at the pressure plate so that an interval between the additional cam surface and the third plate is reduced as the additional cam surface extends radially inward. The centrifugal weight is preferably placed at a position located between the cam surface of the cam member and the third plate and between the additional cam surface of the pressure plate and the third plate.

When the engine is stopped, the cam member presses the centrifugal weight toward the third plate by receiving a force from the elastic body, and the centrifugal weight moves radially inward on the cam surface by receiving a force from the cam member. Upon movement of the centrifugal weight from a position on the cam surface of the cam member to a position on the additional cam surface of the pressure plate, the pressure plate receives, from the centrifugal weight, a force for moving the pressure plate toward the first and second plates, and the first and second plates are pressed against each other by the pressure plate. Upon increase of the engine rotational speed, the centrifugal weight moves radially outward, the force received by the pressure plate from the centrifugal weight is decreased, and the force of the pressure plate by which the first and second plates are pressed is decreased. Therefore, the torque transmitted between the first and second plates is reduced. Upon further increase of the engine rotational speed, the centrifugal weight moves further radially outward. Upon movement of the centrifugal weight from the position on the additional cam surface of the pressure plate to the cam surface of the cam member, the cam member receives a force from the centrifugal weight and presses the pressure plate toward the first and second plates. Then, the first and second plates are pressed against each other by the pressure plate, and the torque transmitted between the first and second plates is increased. Thus, the torque transmitted between the first and second plates is temporarily reduced and then increased as the engine rotational speed is increased from the time when the engine is stopped.

According to still another preferred embodiment of the present invention, the centrifugal clutch preferably further includes: a third plate located opposite to the locations of the first and second plates with respect to the pressure plate and supported by the first rotator; a fourth plate located between the third plate and the pressure plate; and a Belleville spring located between the third and fourth plates and arranged to urge the fourth plate toward the pressure plate. A cam surface is preferably provided at the pressure plate so that an interval between the cam surface and the fourth plate is increased as the cam surface extends inwardly in a radial direction of the fourth plate. The centrifugal weight is preferably located between the cam surface of the pressure plate and the fourth plate. The Belleville spring preferably exhibits a characteristic that its elastic force is reduced as the amount of deflection of the Belleville spring is increased.

When the engine is stopped, the fourth plate presses the centrifugal weight toward the pressure plate by receiving an elastic force from the Belleville spring. The pressure plate receives an elastic force from the Belleville spring via the fourth plate and the centrifugal weight, and is pressed toward the first and second plates. The first and second plates are thus pressed against each other by the pressure plate. Upon increase of the engine rotational speed, the centrifugal weight moves radially outward, and the fourth plate receives, from the centrifugal weight, a force for moving the fourth plate toward the third plate, which results in deflection of the Belleville spring. Because the Belleville spring exhibits the characteristic that its elastic force is reduced as the amount of deflection of the Belleville spring is increased, the force of the fourth plate by which the pressure plate is pressed via the centrifugal weight is decreased, and the force of the pressure plate by which the first and second plates are pressed is decreased. Therefore, the torque transmitted between the first and second plates is reduced. Upon further increase of the engine rotational speed, the centrifugal weight moves further radially outward. Then, the force of the centrifugal weight by which the pressure plate is pressed is increased, and the force of the pressure plate by which the first and second plates are pressed is increased. Hence, the torque transmitted between the first and second plates is increased. Thus, the torque transmitted between the first and second plates is temporarily reduced and then increased as the engine rotational speed is increased from the time when the engine is stopped.

According to yet another preferred embodiment of the present invention, the centrifugal clutch is preferably arranged so that torque transmitted between the first and second plates is temporarily reduced to zero and then increased as the engine rotational speed is increased from the time when the engine is stopped.

Thus, engine stalling is more reliably prevented, and creeping performance can be further enhanced.

According to still yet another preferred embodiment of the present invention, a plurality of the first plates and a plurality of the second plates are preferably provided, and the first and second plates are preferably alternately arranged.

In such a multiplate centrifugal clutch, the foregoing effects are more pronounced than in a single plate centrifugal clutch.

Various preferred embodiments of the present invention provide a motorcycle including a centrifugal clutch, capable of being stably parked on a hill without the use of a parking brake, less prone to engine stalling, and achieving favorable creeping performance.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Hereinafter, a motorcycle including a centrifugal clutch according to each preferred embodiment of the present invention will be described in detail with reference to the drawings. It is to be noted that the motorcycle described below is merely an illustrative preferred embodiment of the present invention. The motorcycle according to the present invention is not limited to a motorcycle 1 described below. As used herein, the term "motorcycle" refers to a vehicle of a type in which a body of the vehicle is tilted when the vehicle makes a turn. The motorcycle disclosed herein is not limited to a two-wheeled vehicle but may include three or more wheels.

Figure 1:
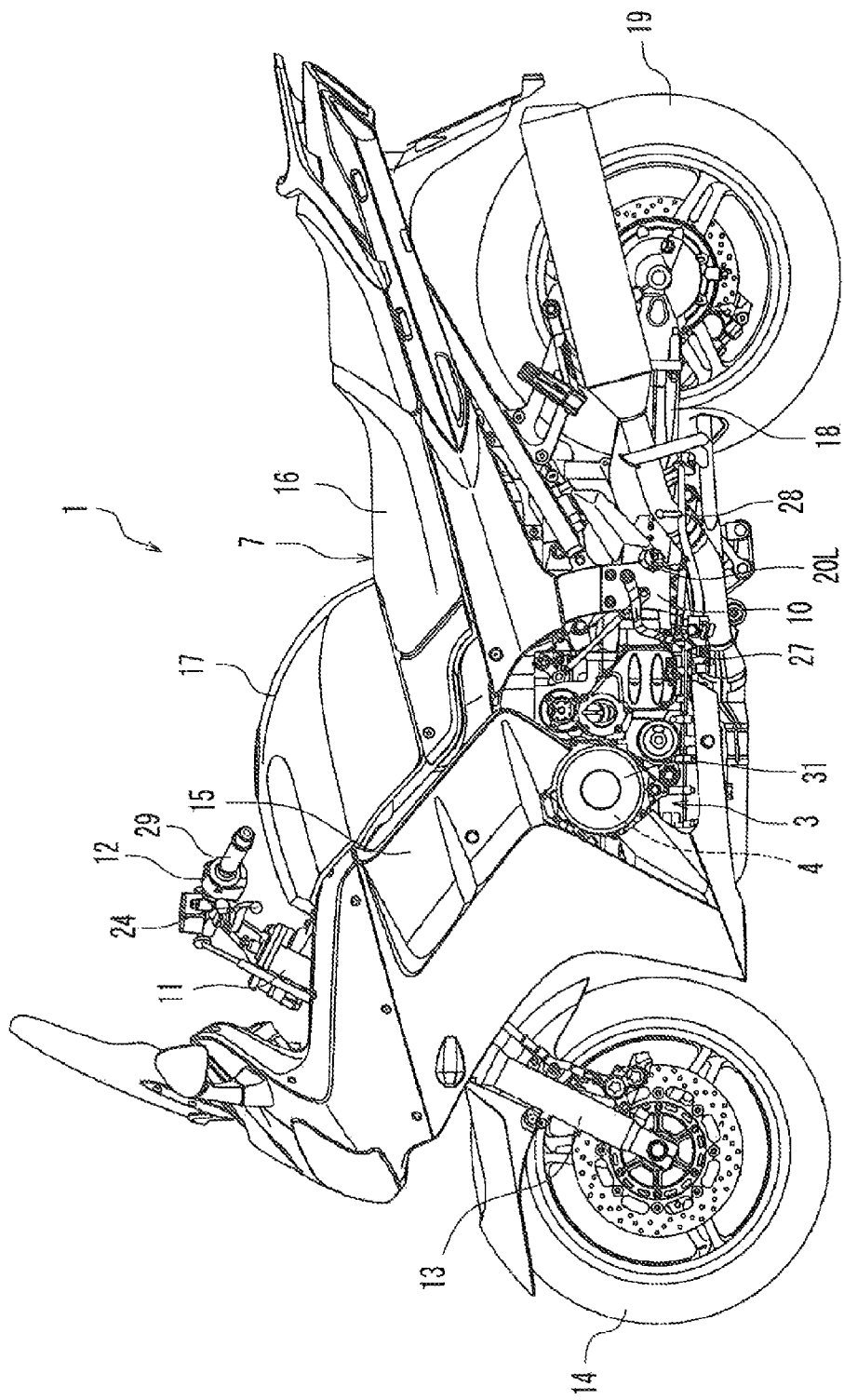
FIG. 1 is a side view of a motorcycle according to a preferred embodiment of the present invention.

FIG. 1 is a left side view of the motorcycle 1 according to the preferred embodiment of the present invention. In the following description, "front", "rear", "right" and "left" mean front, rear, right and left with respect to an occupant sitting on a seat 16 described later, respectively, unless otherwise specified.

As illustrated in FIG. 1, the motorcycle 1 preferably includes a motorcycle main body 7, a front wheel 14, and a rear wheel 19 functioning as a driving wheel. The motorcycle main body 7 preferably includes a body frame 10. The body frame 10 preferably includes a head pipe 11. A steering shaft (not illustrated) to which a handlebar 12 is attached is inserted through the head pipe 11. The steering shaft is provided at its lower end portion with a front fork 13. The front wheel 14 is rotatably attached to a lower end portion of the front fork 13.

A power unit 3 is mounted on the body frame 10 in a suspended manner. A body cover 15 is attached to the body frame 10. A fuel tank 17 is located rearward of the head pipe 11, and the seat 16 is located rearward of the fuel tank 17. A rear arm 18 is supported by the body frame 10 in a swingable manner. The rear wheel 19 is rotatably attached to a rear end portion of the rear arm 18. The rear wheel 19 is connected to an engine 4 (see FIG. 2) via a power transmission mechanism. Power generated by the engine 4 is transmitted to the rear wheel 19 through the power transmission mechanism.

An accelerator grip (not illustrated) is provided at a right portion of the handlebar 12. A grip 29 is provided at a left portion of the handlebar 12. A clutch lever 24 is provided as a clutch operation member to be operated when a centrifugal clutch 2 (see FIG. 2, described below) is manually engaged and/or disengaged. The clutch lever 24 is located forward of the grip 29.

The motorcycle main body 7 is provided at its right and left portions with footrests 20L. A shift pedal 27, to be operated when a transmission gear ratio of a transmission device 5 (see FIG. 2, described below) is changed is provided forward of the left footrest 20L. A side stand 28 is provided at a position located at the left portion of the motorcycle main body 7 and below the shift pedal 27 and the left footrest 20L.

Figure 2:
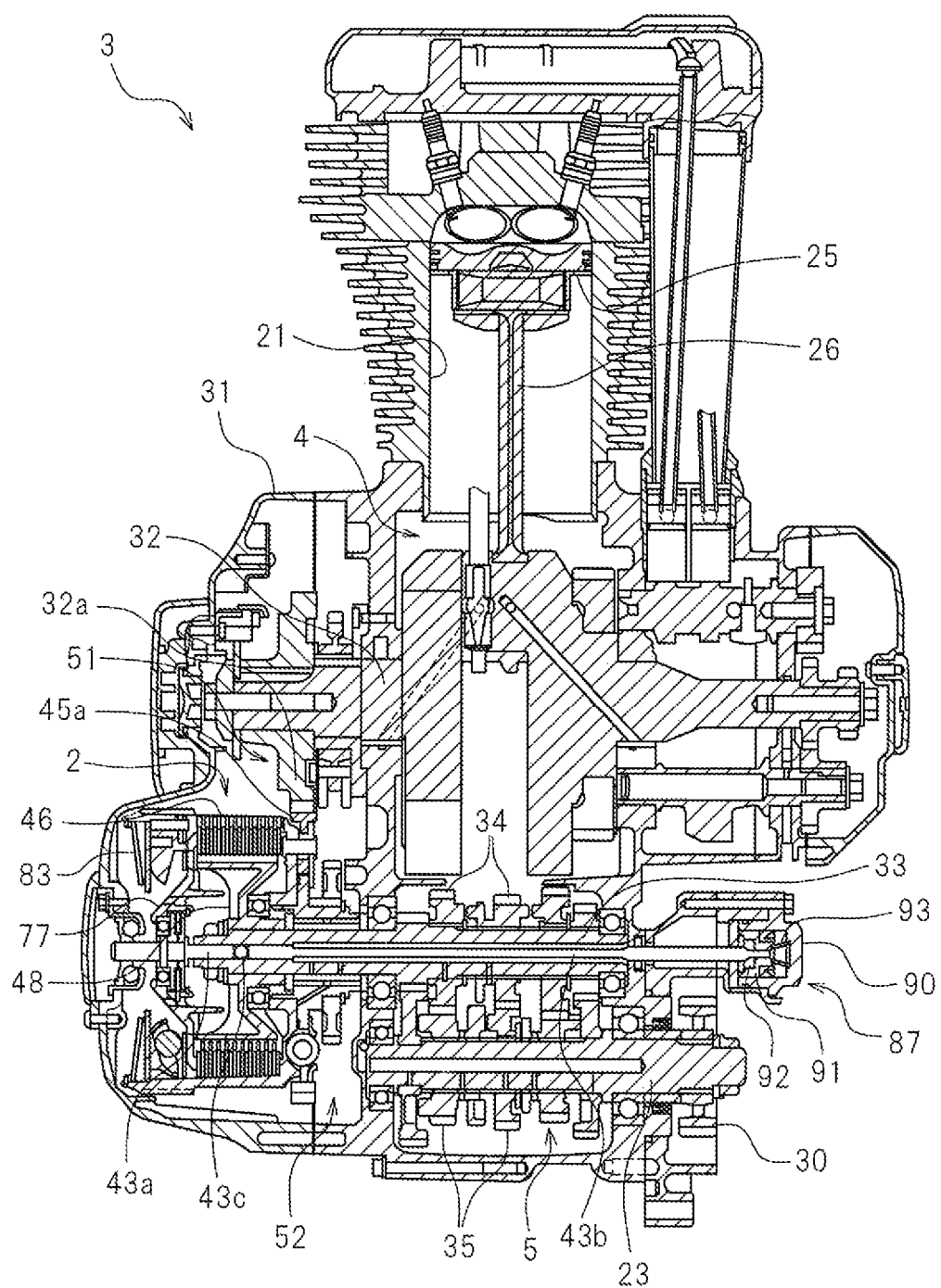
FIG. 2 is a cross-sectional view of a power unit.

FIG. 2 is a cross-sectional view of the power unit 3, illustrating an inner structure of the power unit 3. As illustrated in FIG. 2, the power unit 3 preferably includes the engine 4, the transmission device 5, and the centrifugal clutch 2. In the present preferred embodiment, the engine 4 preferably is an air-cooled single cylinder engine, for example. However, the engine 4 is not limited to any particular type of engine, but may be a water-cooled engine or a multi-cylinder engine, for example.

The engine 4 preferably includes a cylinder 21, a piston 25 that reciprocates within the cylinder 21, and a crankshaft 32 connected to the piston 25 via a connecting rod 26. The crankshaft 32 extends rightward and leftward. For example, the crankshaft 32 extends in a width direction of the motorcycle 1. The crankshaft 32 is contained in a crankcase 31.

A main shaft 33 and a drive shaft 23 are located inside the crankcase 31. The main shaft 33 and the drive shaft 23 are located in parallel with the crankshaft 32. The crankshaft 32 is connected to the main shaft 33 via the centrifugal clutch 2. The main shaft 33 is connected to the drive shaft 23 via the transmission device 5. A sprocket 30 is fixed to a right end portion of the drive shaft 23. Although not illustrated, the other sprocket is fixed to an axle of the rear wheel 19, and the sprocket 30 and the other sprocket are connected to each other through a chain.

The transmission device 5 preferably is a gear-type "stepped transmission", for example. The transmission device 5 used in the preferred embodiment of the present invention may be selected from various conventionally known transmission devices. The transmission device 5 preferably includes a plurality of transmission gears 34 attached to the main shaft 33, and a plurality of transmission gears 35 attached to the drive shaft 23. Although not illustrated, the transmission device 5 preferably further includes a shift fork that moves the transmission gears 34 and 35 rightward or leftward, and a shift cam that moves the shift fork. The shift fork is appropriately moved, thus connecting the selected transmission gear 34 with the selected transmission gear 35.

Power is transmitted from the main shaft 33 to the drive shaft 23 via the connected transmission gears 34 and 35. In accordance with a combination of the selected transmission gears 34 and 35, the transmission gear ratio is changed on a step-by-step basis.

The centrifugal clutch 2 is connected to a first power transmission mechanism 51, and is further connected to the crankshaft 32 via the first power transmission mechanism 51. The centrifugal clutch 2 is connected to the engine 4 via the first power transmission mechanism 51. The first power transmission mechanism 51 includes a gear 32a fixed to the crankshaft 32. It is to be noted that a structure of the first power transmission mechanism 51 is not limited to any particular structure. As the first power transmission mechanism 51, any mechanism may be used that can transmit power generated by the engine 4 to the centrifugal clutch 2.

The centrifugal clutch 2 is connected to a second power transmission mechanism 52, and is further connected to the rear wheel 19 via the second power transmission mechanism 52. The second power transmission mechanism 52 preferably includes the main shaft 33, the transmission device 5, the drive shaft 23, the sprocket 30, and a chain (not illustrated) wound around the sprocket 30 and the sprocket (not illustrated) of the rear wheel 19. It is to be noted that a structure of the second power transmission mechanism 52 is not limited to any particular structure. The second power transmission mechanism 52 used in the preferred embodiment of the present invention may be selected from various conventionally known power transmission mechanisms.

The centrifugal clutch 2 preferably includes a wet multi-plate friction clutch, for example. The centrifugal clutch is automatically engaged/disengaged in accordance with a rotational speed of the crankshaft 32 (which will hereinafter be referred to as an engine rotational speed), and can be forcibly disengaged by an operation performed on the clutch lever 24 by a rider. Next, a structure of the centrifugal clutch 2 will be described in detail below.

Figure 3:
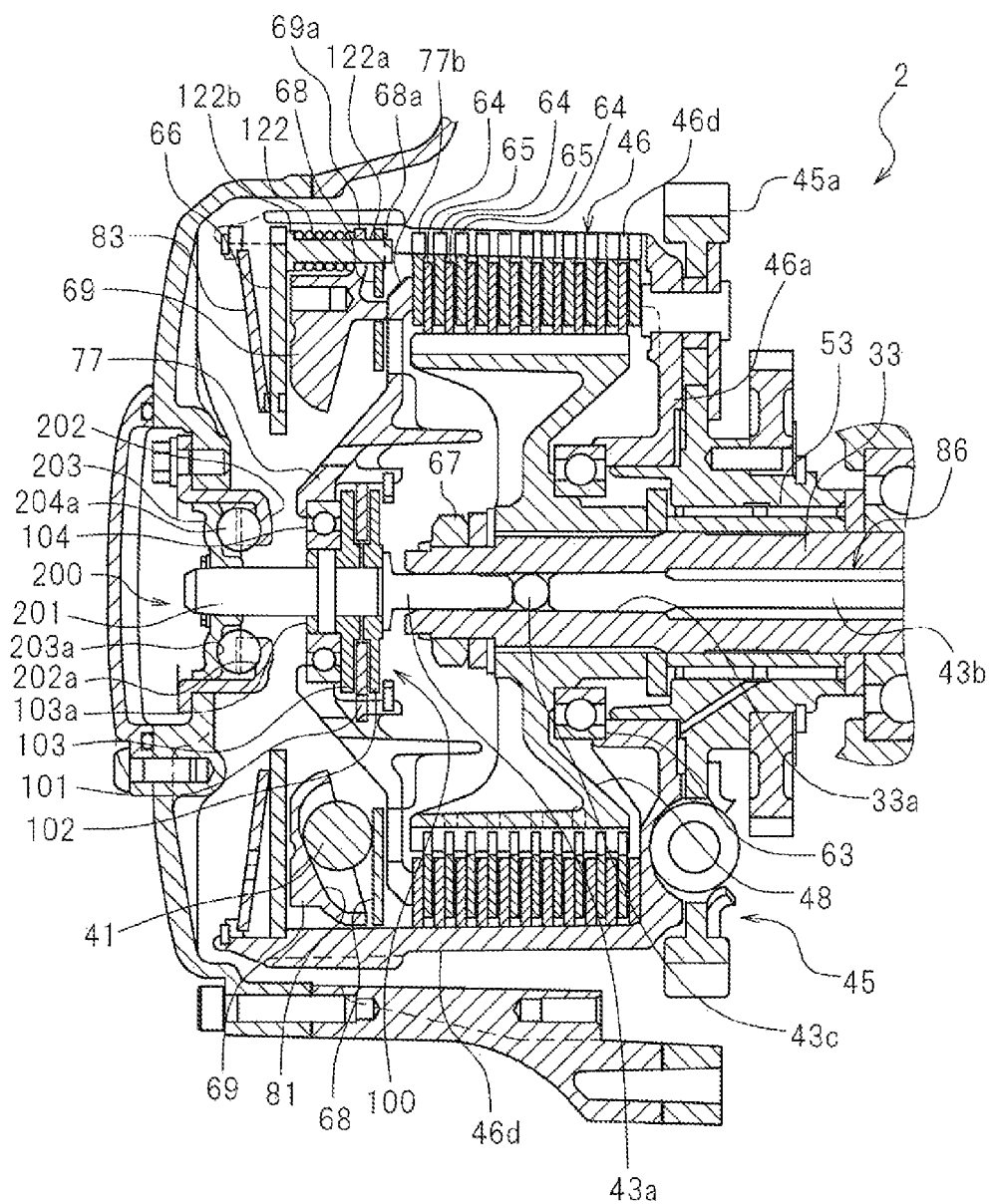
FIG. 3 is a cross-sectional view of a centrifugal clutch according to a first preferred embodiment of the present invention.

As illustrated in FIG. 3, the centrifugal clutch 2 preferably includes a clutch housing 46 serving as an example of a "first rotator" according to the present invention. The main shaft 33 passes through the clutch housing 46. The clutch housing 46 preferably includes a bottom portion 46a into which the main shaft 33 is inserted, and a plurality of arms 46d extending leftward from the bottom portion 46a. The bottom portion 46a is disk-shaped, and the clutch housing 46 has a generally cylindrical shape.

A scissors gear 45 is attached to the clutch housing 46. The scissors gear 45 preferably includes a gear 45a. The gear 45a intermeshes with the gear 32a (see FIG. 2) of the crankshaft 32. The gear 45a of the scissors gear 45 is fixed to the bottom portion 46a of the clutch housing 46. The clutch housing 46 is connected to the crankshaft 32 via the gear 45a and the gear 32a. The clutch housing 46 rotates together with the crankshaft 32. A needle bearing 53 is disposed between the scissors gear 45 and the main shaft 33. The needle bearing 53 allows the scissors gear 45 to rotate with respect to the main shaft 33.

A clutch boss 48 is located inwardly of the clutch housing 46. The main shaft 33 passes through a center portion of the clutch boss 48. The clutch boss 48 is fixed to the main shaft 33 with a nut 67. The clutch boss 48 rotates together with the main shaft 33. A thrust bearing 63 is disposed between the clutch boss 48 and the scissors gear 45.

The arms 46d of the clutch housing 46 are engaged with a plurality of first plates 64. The first plates 64 are arranged rightward and leftward. For example, the first plates 64 are arranged along an axial direction of the main shaft 33. The first plates 64 each have an annular shape. The first plates 64 are supported by the arms 46d so as to be movable rightward and leftward. The first plates 64 rotate together with the arms 46d. For example, the first plates 64 rotate together with the clutch housing 46.

Second plates 65 are located between the first plates 64, adjacent to each other. Similar to the first plates 64, the second plates 65 are also arranged rightward and leftward. For example, the second plates 65 are arranged along the axial direction of the main shaft 33. The second plates 65 each have an annular shape. The second plates 65 face the first plates 64. The second plates 65 are supported by the clutch boss 48, and rotate together with the clutch boss 48.

Figure 4:
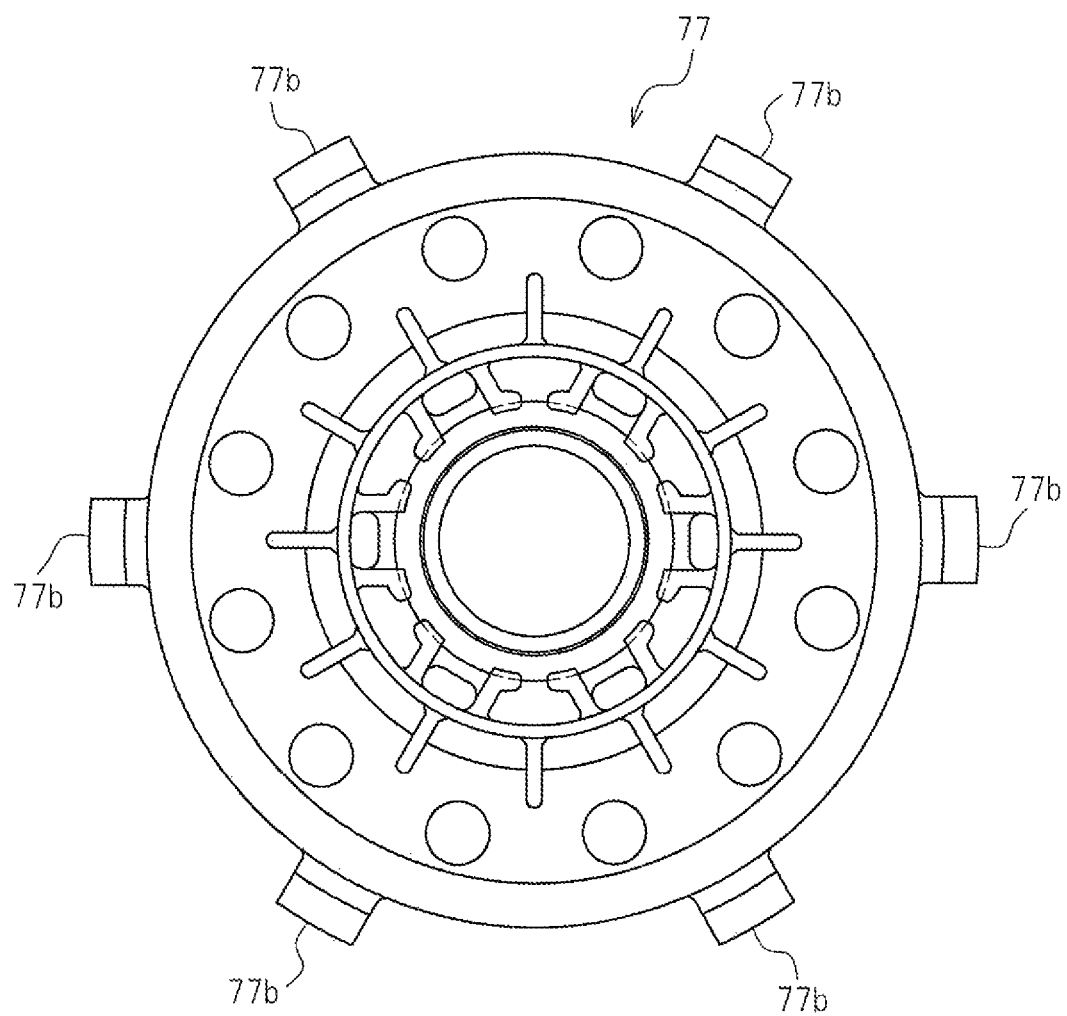
FIG. 4 is a front view of a pressure plate of the centrifugal clutch according to the first preferred embodiment of the present invention.

A pressure plate 77 is located leftward of the first and second plates 64 and 65. As illustrated in FIG. 4, the pressure plate 77 is substantially disk-shaped. As illustrated in FIG. 3, the pressure plate 77 is provided at its center portion with a sub-clutch 100 described later. In a region of the pressure plate 77 facing the leftmost first plate 64, a contact portion 77b is provided that comes into contact with the first plate 64. As illustrated in FIG. 4, a plurality of the contact portions 77b are arranged along a circumferential direction. In the present preferred embodiment and each preferred embodiment described later, the leftmost one of the first and second plates 64 and 65 is the first plate 64, but it is also contemplated that the leftmost plate may be the second plate 65. In that case, the contact portions 77b of the pressure plate 77 face the second plate 65 and come into contact with the second plate 65. The pressure plate 77 is provided so as to be movable rightward and leftward. Upon rightward movement of the pressure plate 77, the contact portions 77b come into contact with the leftmost first plate 64 and press this first plate 64 rightward. As a result, the first and second plates 64 and 65 are pressed against each other.

Figure 5:
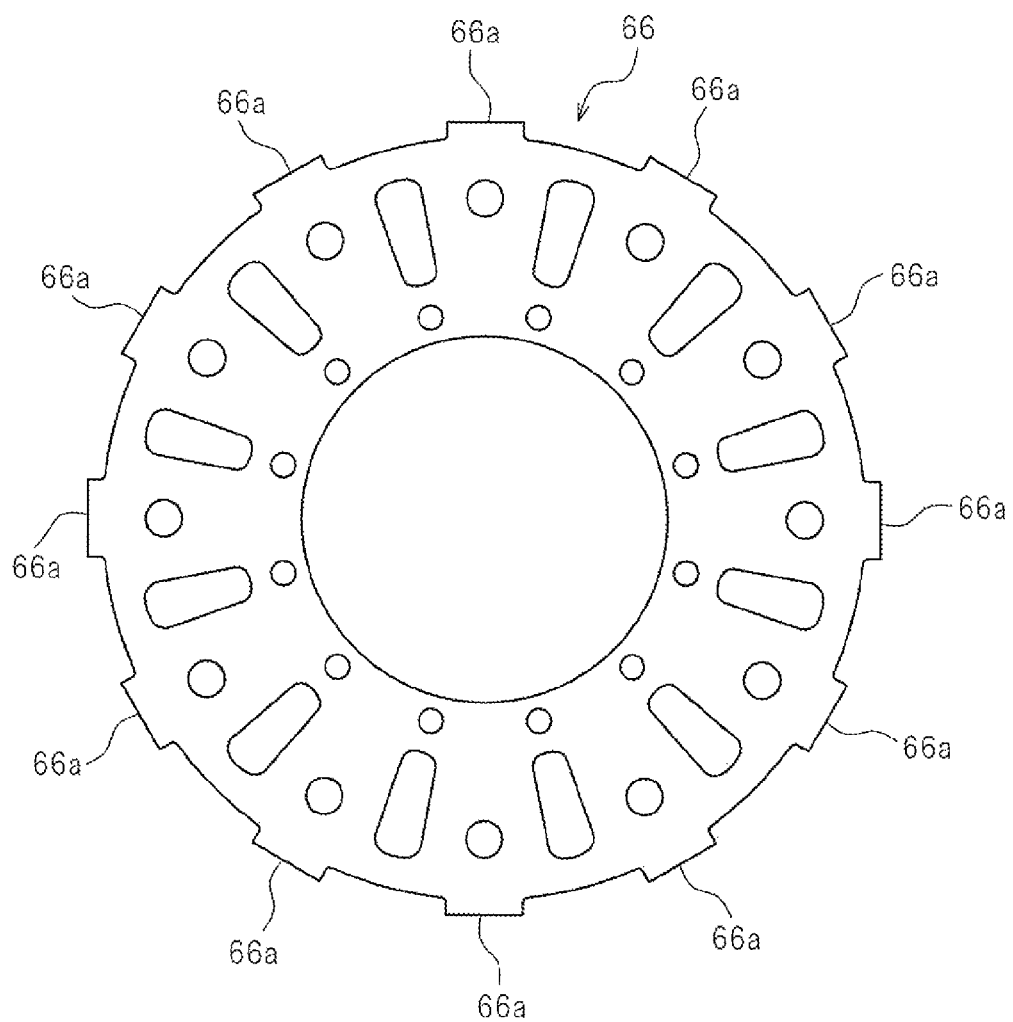
FIG. 5 is a front view of a third plate of the centrifugal clutch according to the first preferred embodiment of the present invention.

A third plate 66 is located leftward of the pressure plate 77. As illustrated in FIG. 5, the third plate 66 has an annular shape. As illustrated in FIG. 3, the third plate 66 is located opposite to the locations of the first and second plates 64 and 65 with respect to the pressure plate 77. The third plate 66 is supported by the arms 46d of the clutch housing 46. More specifically, as illustrated in FIG. 5, a plurality of circumferentially arranged convex portions 66a are provided at an outer peripheral portion of the third plate 66. Each convex portion 66a is located between the arms 46d adjacent to each other, thus allowing the third plate 66 to be supported by the arms 46d.

A Belleville spring 83 is located leftward of the third plate 66. A radially outer portion of the Belleville spring 83 is fixed to the arms 46d of the clutch housing 46. A radially inner portion of the Belleville spring 83 is in contact with the third plate 66. The Belleville spring 83 is provided so as to urge the third plate 66 rightward.

Figure 6:
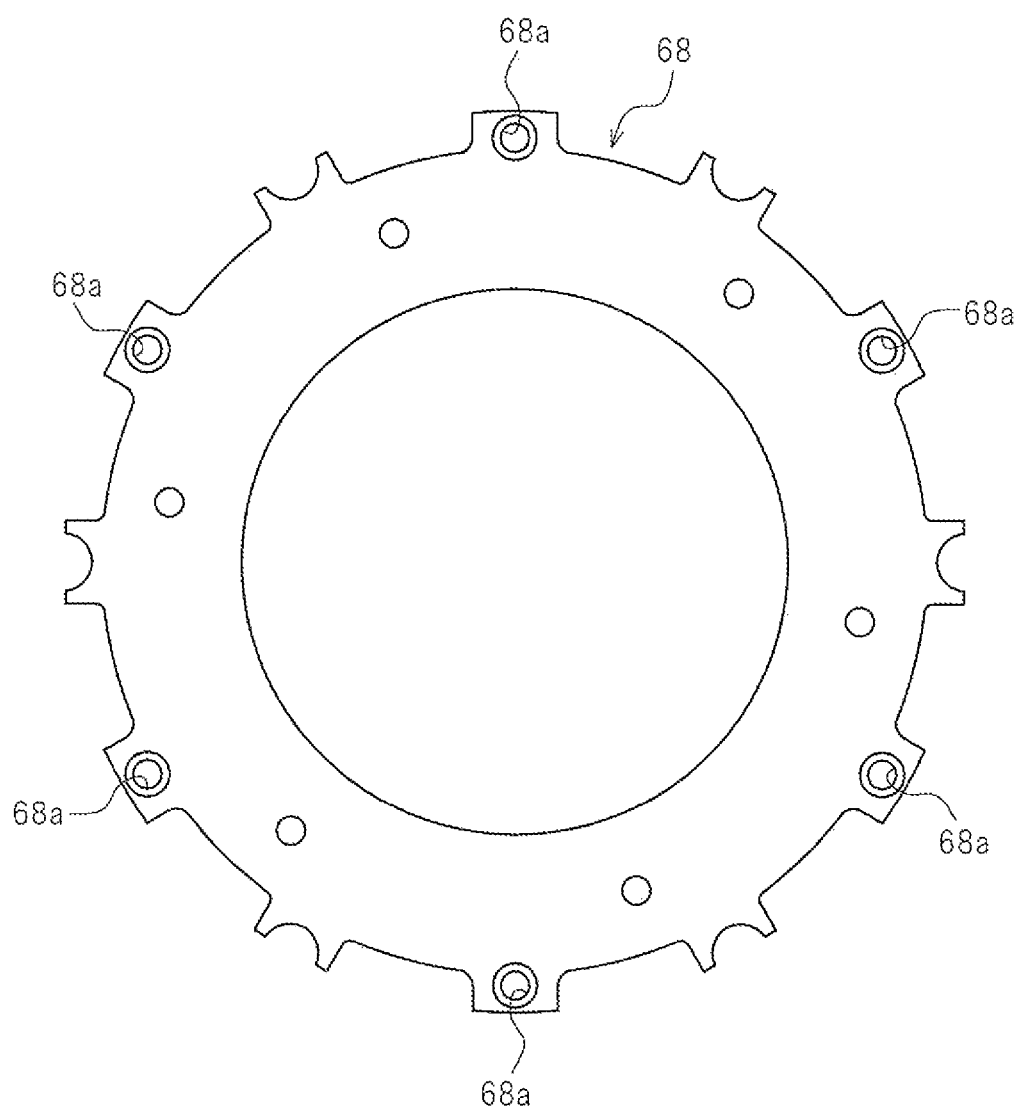
FIG. 6 is a front view of a fourth plate of the centrifugal clutch according to the first preferred embodiment of the present invention.

A fourth plate 68 is disposed between the third plate 66 and the pressure plate 77. As illustrated in FIG. 6, the fourth plate 68 has an annular shape. As illustrated in FIG. 3, spring holders 122a that extend rightward are provided at a radially outer portion of the third plate 66. Each spring holder 122a is rod-shaped. Right end portions of the spring holders 122a are inserted into holes 68a of the fourth plate 68. The fourth plate 68 is supported by the right end portions of the spring holders 122a. The fourth plate 68 is provided so as to be able to come into contact with the pressure plate 77.

Figure 7:
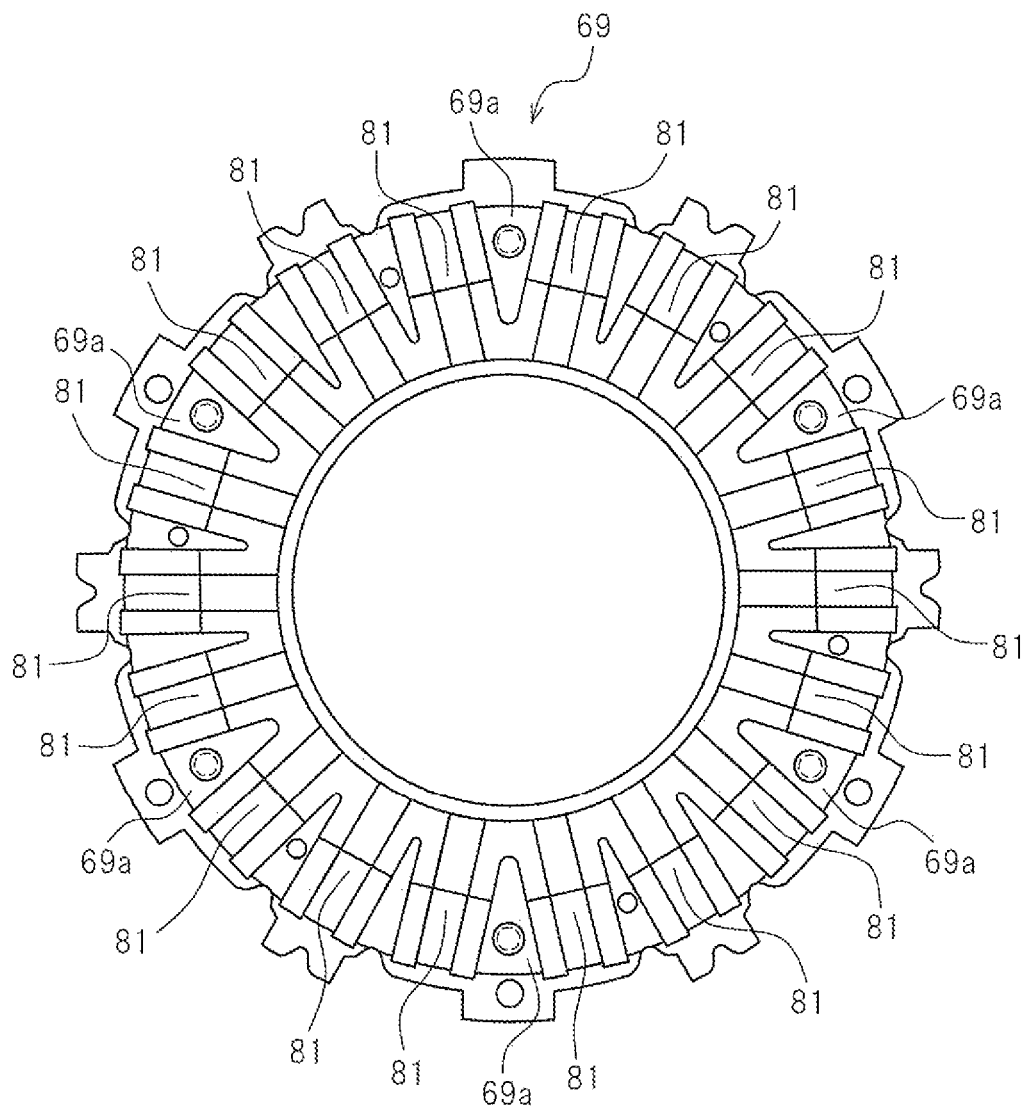
FIG. 7 is a front view of a cam member of the centrifugal clutch according to the first preferred embodiment of the present invention.

A cam member 69 is disposed between the third plate 66 and the fourth plate 68. As illustrated in FIG. 7, the cam member 69 is substantially disk-shaped. A cam surface 81 is provided at a right portion of the cam member 69. The cam surface 81 is arranged so that an interval between the cam surface 81 and the fourth plate 68 is increased as the cam surface 81 extends radially inward. The cam surface 81 is inclined leftward as it extends radially inward. A plurality of the cam surfaces 81 are arranged in a circumferential direction. The cam surfaces 81 are radially provided. At a radially outer portion of the cam member 69, engagement portions 69a are provided for engagement with the spring holders 122a. The cam member 69 is supported by the spring holders 122a so as to be movable rightward and leftward.

A large diameter portion 122b is provided at a left end of each spring holder 122a. A coil spring 122 serving as an example of an "elastic body" according to the present invention is disposed between the large diameter portion 122b and the engagement portion 69a of the cam member 69. It is to be noted that the elastic body is not limited to a coil spring or any particular type of spring, but may be any other type of spring. Alternatively, any other elastic body may be used instead of a spring. The coil spring 122 urges the cam member 69 rightward. For example, the coil spring 122 urges the cam member 69 toward the pressure plate 77. In the present preferred embodiment, a left end portion of the coil spring 122 is secured to the large diameter portion 122b of the spring holder 122a, and a right end portion of the coil spring 122 is secured to the engagement portion 69a of the cam member 69. However, the left end portion of the coil spring 122 may be secured to the third plate 66. The right end portion of the coil spring 122 may urge the cam member 69 via the other member. In the present preferred embodiment, the cam member 69 is provided so as to be pressed rightward by the coil spring 122, but may also be provided so as to be pulled rightward by the elastic body. For example, a tension spring may be provided rightward of the cam member 69.

A centrifugal weight 41 is disposed between the cam surface 81 of the cam member 69 and a left surface of the fourth plate 68. A plurality of the cam surfaces 81 are provided at the cam member 69, and the centrifugal weight 41 is provided on each cam surface 81. For example, a plurality of the centrifugal weights 41 are located between the cam member 69 and the fourth plate 68. In the present preferred embodiment, each centrifugal weight 41 preferably includes a circular cylindrical roller. Each centrifugal weight 41 is provided so as to be rolled on the cam surface 81. However, each centrifugal weight 41 is not limited to any particular shape but may, for example, have a spherical shape. Each centrifugal weight 41 does not necessarily have to be rolled on the cam surface 81, but also may be provided so as to be slid on the cam surface 81. Each centrifugal weight 41 revolves around a shaft center of the main shaft 33 in association with rotation of the clutch housing 46, and moves radially outward on the cam surface 81 due to centrifugal force produced during revolution of the centrifugal weight 41.

As illustrated in FIG. 3, the centrifugal clutch 2 is provided with the sub-clutch 100. It is also contemplated that the sub-clutch 100 may be omitted. The sub-clutch 100 preferably includes a friction plate 101, a right plate 102 located rightward of the friction plate 101, and a left plate 103 located leftward of the friction plate 101.

The friction plate 101 is engaged with the pressure plate 77 so as to be rotated together with the pressure plate 77. The right plate 102 is fixed to a push rod 43a. The right plate 102 is movable axially together with the push rod 43a, and is rotated together with the push rod 43a. The left plate 103 is fixed to a slide shaft 201. The left plate 103 is provided so as to be rotated together with the slide shaft 201 and movable axially together with the slide shaft 201. The left plate 103 preferably includes a boss portion 103a extending leftward. The boss portion 103a is provided with a bearing 104. The pressure plate 77 is rotatably supported by the bearing 104.

The left plate 103 and the pressure plate 77 are relatively rotatable. The left plate 103 and the pressure plate 77 are provided so as to be moved together axially.

Upon leftward movement of the push rod 43a, the right plate 102 also moves leftward. Then, the friction plate 101 is caught between the right and left plates 102 and 103. Thus, a rotational force of the pressure plate 77 is transmitted to the right and left plates 102 and 103 via the friction plate 101 so as to apply the rotational force to the right and left plates 102 and 103. The main shaft 33 preferably includes a through hole 33a provided therein. The push rod 43a, a ball 43c and a push rod 43b are inserted into the through hole 33a.

As illustrated in FIG. 3, the centrifugal clutch 2 is provided with a booster mechanism 200. It is also contemplated that the booster mechanism 200 may be omitted. The booster mechanism 200 converts a portion of the rotational force of the pressure plate 77 into a force for disengaging the centrifugal clutch 2, thus reducing power required for disengagement of the centrifugal clutch 2. The booster mechanism 200 according to the present preferred embodiment preferably includes a "ball cam", for example. The booster mechanism 200 preferably includes the slide shaft 201 fixed to the left plate 103, a first cam plate 202, a second cam plate 203, and a coil spring (not illustrated) that urges the second cam plate 203 in a direction away from the first cam plate 202.

The slide shaft 201 is inserted through a center portion of the first cam plate 202. The slide shaft 201 is axially movable with respect to the first cam plate 202 and is rotatable relative to the first cam plate 202. The slide shaft 201 is fitted into a center portion of the second cam plate 203. The second cam plate 203 is moved axially together with the slide shaft 201 and is rotated together with the slide shaft 201.

At a left surface of the first cam plate 202, a cam surface 202a is provided. At a right surface of the second cam plate 203, a cam surface 203a is provided. The cam surfaces 202a and 203a are shaped so that a ball 204a moves out of position between the cam surfaces 202a and 203a upon rotation of the second cam plate 203 in a given direction (i.e., in the same direction as the rotation direction of the pressure plate 77), and the ball 204a moves into position between the cam surfaces 202a and 203a upon rotation of the second cam plate 203 in the direction opposite to the given direction. Upon engagement of the sub-clutch 100, the rotational force of the pressure plate 77 is transmitted to the left plate 103 so as to rotate the left plate 103. Then, the slide shaft 201 is rotated, and the second cam plate 203 is also rotated. When an urging force of the coil spring is overcome by the second cam plate 203 and rotation of the second cam plate 203, the first and second cam plates 202 and 203 are pressed by the ball 204a so that the first and second cam plates 202 and 203 move away from each other, and the second cam plate 203 is moved leftward. Then, the slide shaft 201 is moved leftward, and the pressure plate 77 is also moved leftward. When the sub-clutch 100 is disengaged and the force for rotating the second cam plate 203 is lost, the second cam plate 203 is moved rightward while being rotated in the opposite direction due to the urging force of the coil spring.

As described above, the centrifugal clutch 2 according to the present preferred embodiment can be forcibly disengaged. The motorcycle 1 is provided with a clutch release mechanism 86 that forcibly disengages the centrifugal clutch 2. In addition to the push rod 43a, the ball 43c and the push rod 43b mentioned above, the clutch release mechanism 86 preferably includes a driving mechanism 87 (see FIG. 2) that drives the push rod 43b.

As illustrated in FIG. 2, the driving mechanism 87 preferably includes a cylinder 90, and a piston 91 fixed to a right end portion of the push rod 43*b*. The piston 91 is provided so as to be movable rightward and leftward. Upon leftward movement of the piston 91, the push rod 43*b* is pushed leftward. Between the piston 91 and the cylinder 90, there is provided a pressure chamber 92. The pressure chamber 92 is filled with oil. Between the piston 91 and the cylinder 90, there is located a coil spring 93. The piston 91 is urged rightward by the coil spring 93.

Upon gripping of the clutch lever 24 by the rider, oil is supplied to the pressure chamber 92, and the pressure chamber 92 is increased in pressure. Then, the piston 91 moves leftward to move the push rod 43*b* leftward. The push rod 43*b* presses the pressure plate 77 leftward via the ball 43*c* and the push rod 43*a*. As a result, the pressure plate 77 moves leftward and the centrifugal clutch 2 is disengaged. Upon release of the clutch lever 24 by the rider, the pressure chamber 92 is reduced in pressure. When the sum of a force of the Belleville spring 83 by which the pressure plate 77 is pressed rightward and a force of the coil spring 93 by which the piston 91 is pulled rightward exceeds a force of oil pressure by which the piston 91 is pressed leftward, the pressure plate 77 is moved rightward. Then, the first and second plates 64 and 65 are pressed against each other by the pressure plate 77, and the centrifugal clutch 2 is engaged.

Figure 8:
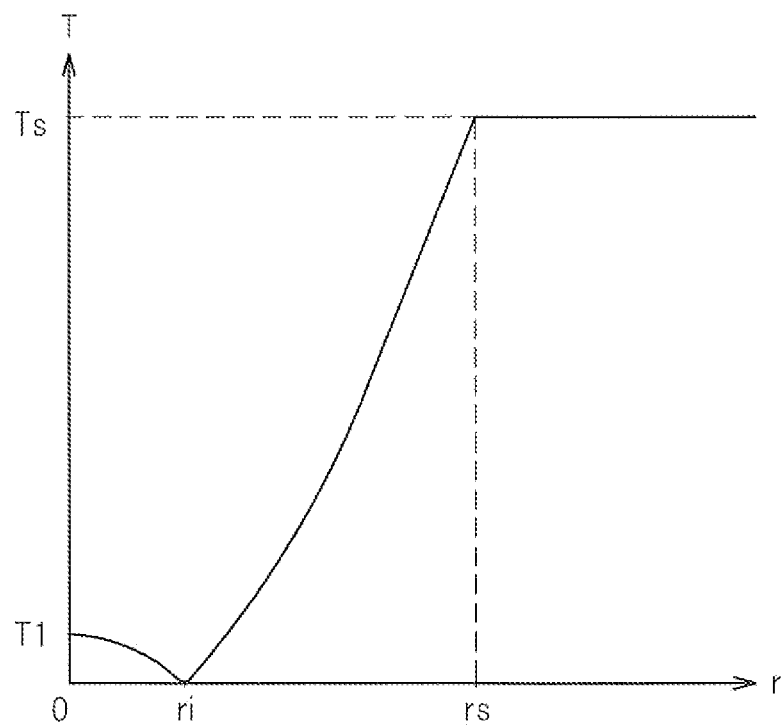
FIG. 8 is a graph illustrating a characteristic curve of the centrifugal clutch according to the first and second preferred embodiments of the present invention.

FIG. 8 is a graph illustrating a characteristic curve of the centrifugal clutch 2. In the graph of FIG. 8, the horizontal axis represents an engine rotational speed r, and the vertical axis represents a transmission torque T. In the centrifugal clutch 2 according to the present preferred embodiment, the transmission torque T is T1 greater than zero when the engine 4 is stopped, i.e., when the engine rotational speed r is zero. The transmission torque T is temporarily reduced in accordance with an increase in the engine rotational speed r, and reaches zero when the engine rotational speed r is ri. Upon further increase of the engine rotational speed r, the transmission torque T is increased from zero, and the transmission torque T is then held at a constant value Ts when the engine rotational speed r is equal to or higher than rs.

When the engine 4 is stopped, substantially no centrifugal force is exerted on each centrifugal weight 41. Because the cam member 69 is not pressed by the centrifugal weights 41, the cam member 69 is urged rightward by the coil spring 122 to press the pressure plate 77 rightward. The pressure plate 77 pressed by the cam member 69 presses the leftmost first plate 64 rightward, thus pressing the first and second plates 64 and 65 against each other. As a result, torque transmission between the first and second plates 64 and 65 is enabled, and the resulting transmission torque is greater than zero. The transmission torque obtained in this case is T1 mentioned above.

When the engine rotational speed r is increased from zero, centrifugal force is exerted on each centrifugal weight 41, and each centrifugal weight 41 is moved radially outward. Then, the cam member 69 is pressed leftward by each centrifugal weight 41, and the cam member 69 is moved leftward. Since the force of the cam member 69 by which the pressure plate 77 is pressed rightward is reduced, the force of the pressure plate 77 by which the leftmost first plate 64 is pressed rightward is reduced. Therefore, the force by which the first and second plates 64 and 65 are pressed against each other is decreased, and the torque transmittable between the first and second plates 64 and 65 is reduced. When the engine rotational speed r reaches ri, no torque is transmittable between the first and second plates 64 and 65, and thus the transmission torque reaches zero.

Upon further increase of the engine rotational speed r, each centrifugal weight 41 is moved further radially outward.

When the cam member 69 is brought into contact with the third plate 66, the leftward movement of the cam member 69 is restricted, and the cam member 69 receives a rightward urging force from the Belleville spring 83 via the third plate 66. Each centrifugal weight 41 receives the urging force of the Belleville spring 83 via the third plate 66 and the cam member 69, and thus presses the fourth plate 68 rightward. Then, the fourth plate 68 presses the pressure plate 77 rightward, and the pressure plate 77 is moved rightward. The first and second plates 64 and 65 are thus pressed against each other by the pressure plate 77. As a result, the torque transmission between the first and second plates 64 and 65 is enabled. The higher the engine rotational speed r, the greater the force of the pressure plate 77 by which the first plate 64 is pressed, and therefore, the greater the transmission torque between the first and second plates 64 and 65. As illustrated in FIG. 8, the transmission torque T is increased in accordance with an increase in the engine rotational speed r.

Upon movement of each centrifugal weight 41 to a radially outermost position, further radially outward movement of each centrifugal weight 41 is restricted by the cam member 69. Therefore, the force of the pressure plate 77 by which the first plate 64 is pressed becomes constant. Hence, when the engine rotational speed r is equal to or higher than rs, the transmission torque T between the first and second plates 64 and 65 is held at the constant value Ts.

The centrifugal weights 41, the cam member 69, the pressure plate 77, the coil spring 122, the third plate 66 and the fourth plate 68 are operated in conjunction with each other as described above, thus obtaining the characteristics illustrated in FIG. 8.

As described above, in the motorcycle 1 according to the present preferred embodiment, the transmission torque T1 of the centrifugal clutch 2 when the engine 4 is stopped is greater than zero. Hence, even when the engine 4 is stopped, the gears of the transmission device 5 are engaged (more specifically, the transmission gear 34 attached to the main shaft 33 and the transmission gear 35 attached to the drive shaft 23 are allowed to intermesh with each other), thus allowing the rear wheel 19 and the engine 4 to be connected to each other. With the rear wheel 19 and the engine 4 being connected to each other, the crankshaft 32 has to be rotated in order to rotate the rear wheel 19, and therefore, a braking force is applied to the rear wheel 19. As a result, rotation of the rear wheel 19 can be restricted, and the motorcycle 1 can be parked on a hill without the use of a parking brake.

As illustrated in FIG. 8, the transmission torque T of the centrifugal clutch 2 is temporarily reduced and then increased as the engine rotational speed r is increased from the time when the engine 4 is stopped. Because the centrifugal clutch 2 exhibits such characteristics, the transmission torque can be kept low during idling even when the transmission torque T1 during engine stoppage is set at a relatively high level. Furthermore, the transmission torque can be kept low during creeping. Accordingly, it is possible to achieve both of stable parking of the motorcycle 1 on a hill and prevention of engine stalling without using the parking brake. Moreover, creeping performance can be favorably maintained.

In particular, according to the present preferred embodiment, the transmission torque T of the centrifugal clutch 2 is temporarily reduced to zero and then increased as the engine rotational speed r is increased from the time when the engine 4 is stopped. Therefore, engine stalling can be more reliably prevented. Besides, creeping performance can be further enhanced.

Note that the transmission torque T1 during engine stoppage can be easily adjusted by changing a spring constant of the coil spring 122, for example. The braking force applied to the rear wheel 19 during engine stoppage is adjustable.

The transmission torque of the centrifugal clutch 2 during idling may be smaller than the transmission torque T1 during engine stoppage, but is not limited to any particular level. The transmission torque of the centrifugal clutch 2 during idling may be equal to the transmission torque T1 during engine stoppage, or may be greater than the transmission torque T1. The same goes for each preferred embodiment described later.

Second Preferred Embodiment

Figure 9:
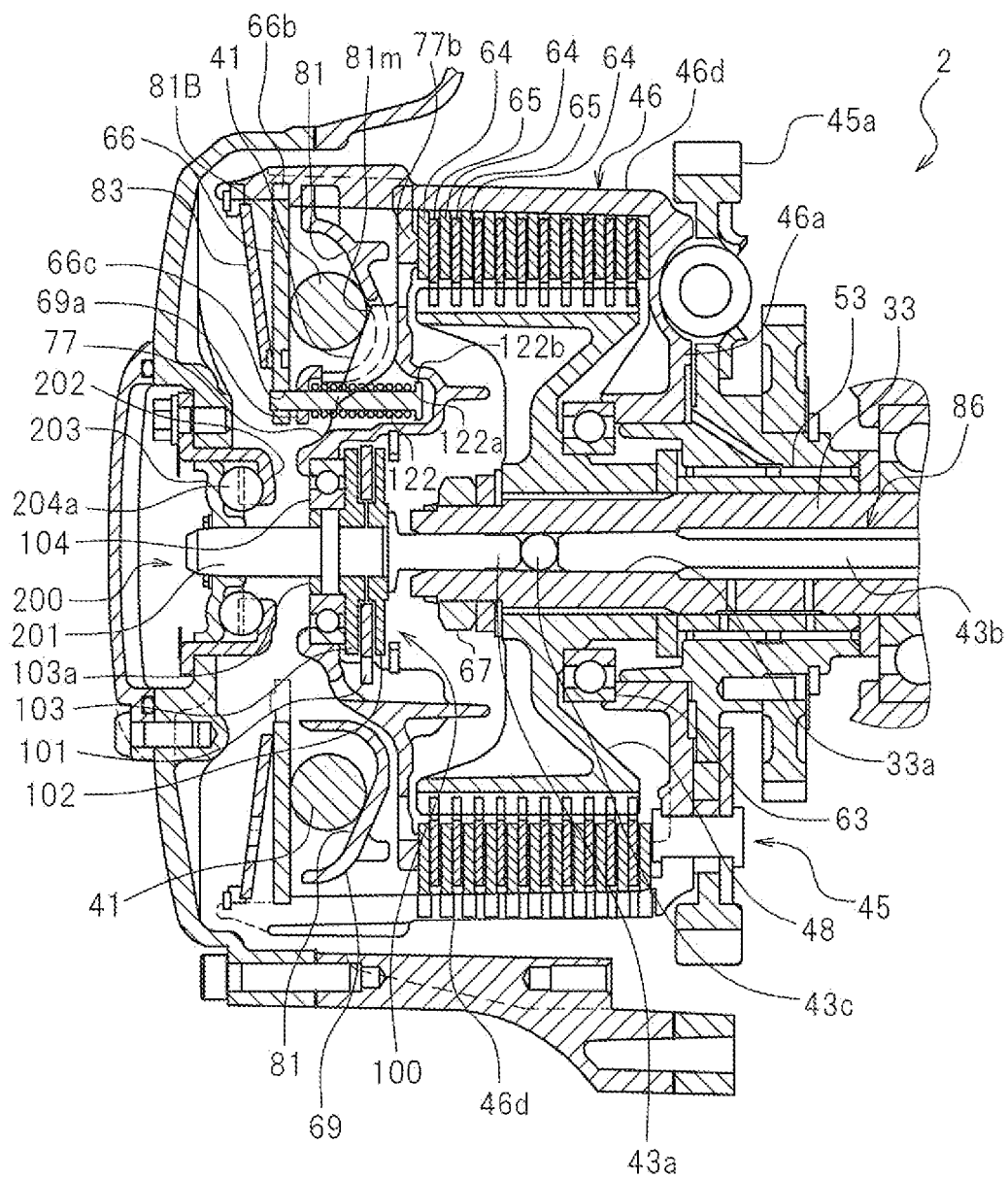
FIG. 9 is a cross-sectional view of the centrifugal clutch according to the second preferred embodiment of the present invention.

FIG. 9 is a cross-sectional view of a centrifugal clutch 2 of a motorcycle 1 according to a second preferred embodiment of the present invention. The centrifugal clutch 2 according to the second preferred embodiment also exhibits characteristics similar to those of the centrifugal clutch 2 according to the first preferred embodiment. In the following description, elements similar to those of the first preferred embodiment are identified by similar reference signs, and detailed description thereof will be omitted.

Figure 10:
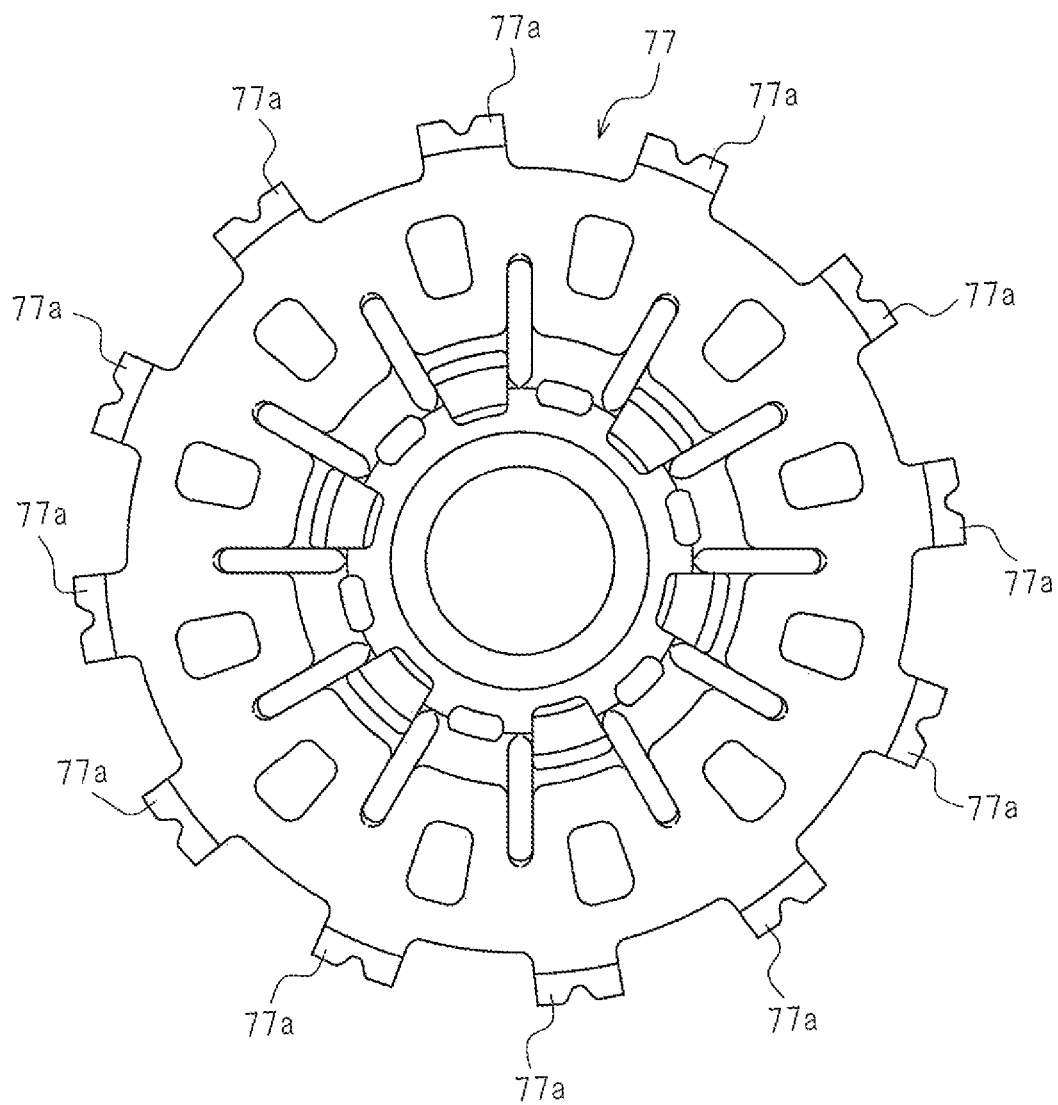
FIG. 10 is a front view of a pressure plate of the centrifugal clutch according to the second preferred embodiment of the present invention.

Also in the second preferred embodiment, a pressure plate 77 is located leftward of first and second plates 64 and 65. Although the pressure plate 77 according to the second preferred embodiment is different in shape from the pressure plate 77 according to the first preferred embodiment, the pressure plate 77 according to the second preferred embodiment is substantially disk-shaped as illustrated in FIG. 10. The pressure plate 77 is provided at its center portion with a sub-clutch 100. Engagement portions 77a for engagement with arms 46d of a clutch housing 46 are provided at a radially outward portion of the pressure plate 77. The pressure plate 77 is provided so as to be movable rightward and leftward with respect to the clutch housing 46. However, the pressure plate 77 is not rotatable with respect to the clutch housing 46 and is rotated together with the clutch housing 46. A contact portion 77b that comes into contact with the leftmost first plate 64 is provided in the pressure plate 77.

Figure 11:
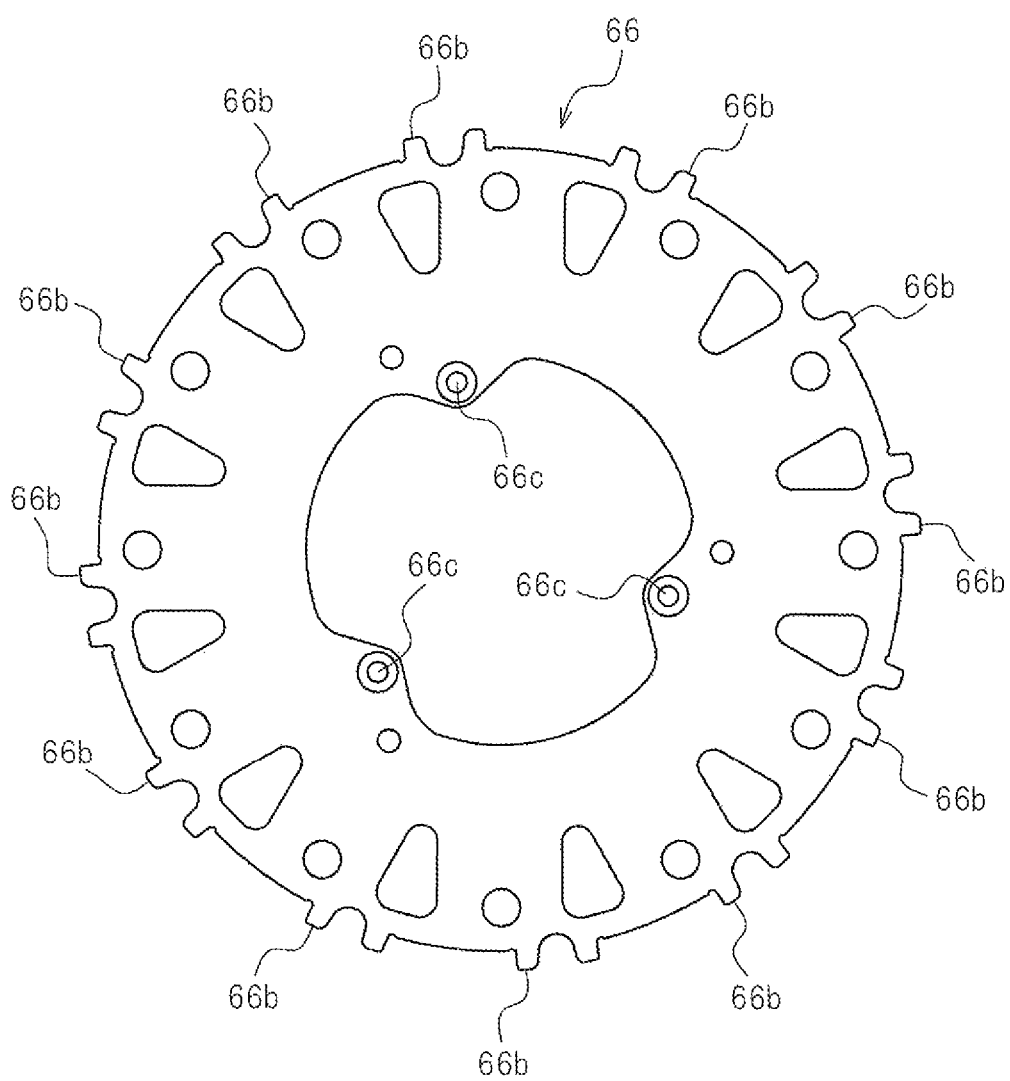
FIG. 11 is a front view of a third plate of the centrifugal clutch according to the second preferred embodiment of the present invention.

A third plate 66 is located leftward of the pressure plate 77. As illustrated in FIG. 11, the third plate 66 has an annular shape. The third plate 66 is located opposite to the locations of the first and second plates 64 and 65 with respect to the pressure plate 77. Radially outward portions 66b of the third plate 66 are supported by the arms 46d of the clutch housing 46. In a radially inward portion of the third plate 66, holes 66c are provided, and a spring holder 122a is fitted into each hole 66c.

Figure 12:
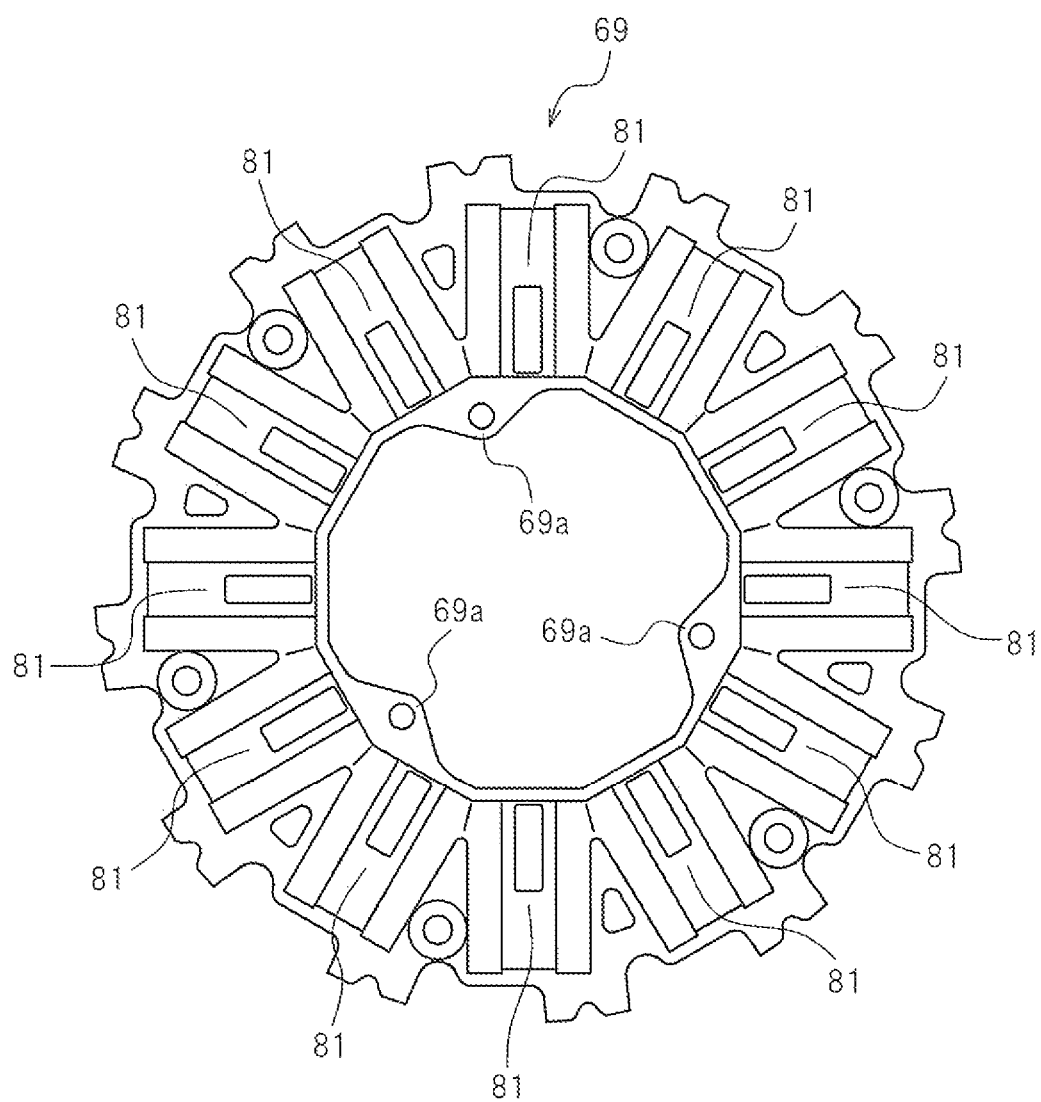
FIG. 12 is a front view of a cam member of the centrifugal clutch according to the second preferred embodiment of the present invention.

A cam member 69 is disposed between the third plate 66 and the pressure plate 77. As illustrated in FIG. 12, the cam member 69 is substantially disk-shaped. At a left portion of the cam member 69, a cam surface 81 is provided. The cam surface 81 is arranged so that an interval between the cam surface 81 and the third plate 66 is increased as the cam surface 81 extends radially inward. The cam surface 81 is inclined rightward as it extends radially inward. A plurality of the cam surfaces 81 are arranged in a circumferential direction. The cam surfaces 81 are radially provided. A radially outer portion of the cam member 69 is engaged with the arms 46d of the clutch housing 46. The cam member 69 is supported by the arms 46d so as to be movable rightward and leftward. Engagement portions 69a for engagement with the spring holders 122a are provided at a radially inner portion of the cam member 69.

At a right end of each spring holder 122a, a large diameter portion 122b is provided. Between the large diameter portion 122b and the engagement portion 69a of the cam member 69, a coil spring 122 is located, which serves as an example of the "elastic body" according to the present invention. It is to be noted that the elastic body is not limited to a coil spring or any particular type of spring, but may be any other type of spring. Alternatively, any other elastic body may be used instead of a spring. The coil spring 122 urges the cam member 69 leftward. For example, the coil spring 122 urges the cam member 69 toward the third plate 66. In the present preferred embodiment, a right end portion of the coil spring 122 is secured to the large diameter portion 122b of the spring holder 122a, and a left end portion of the coil spring 122 is secured to the engagement portion 69a of the cam member 69. In the present preferred embodiment, the cam member 69 is provided so as to be pressed leftward by the coil spring 122, but may be provided so as to be pulled leftward by the elastic body. For example, a tension spring may be provided leftward of the cam member 69.

An additional cam surface 81B is provided at a left portion of the pressure plate 77. The cam surface 81B is arranged so that an interval between the cam surface 81B and the third plate 66 is reduced as the cam surface 81B extends radially inward. The cam surface 81B is inclined leftward as it extends radially inward. The cam surface 81B intersects the cam surface 81 at a radially intermediate portion 81m of the cam surface 81 of the cam member 69.

Each centrifugal weight 41 is placed at a position located between the cam surface 81 of the cam member 69 and the third plate 66 and between the additional cam surface 81B of the pressure plate 77 and the third plate 66. A plurality of the cam surfaces 81 are provided at the cam member 69, a plurality of the cam surfaces 81B are provided at the pressure plate 77, and the centrifugal weight 41 is provided on each of the cam surfaces 81 and 81B. For example, a plurality of the centrifugal weights 41 are located between the cam member 69 and pressure plate 77, and the third plate 66. Each centrifugal weight 41 preferably includes a circular cylindrical roller in the present preferred embodiment, but similarly to the first preferred embodiment, for example, the shape of each centrifugal weight 41 is not limited to any particular shape.

Also in the present preferred embodiment, the centrifugal clutch 2 exhibits characteristics similar to those of the centrifugal clutch 2 according to the first preferred embodiment. The centrifugal clutch 2 according to the second preferred embodiment also exhibits the characteristics illustrated in FIG. 8.

When the engine 4 is stopped, substantially no centrifugal force is exerted on each centrifugal weight 41. Because the cam member 69 is pressed leftward by the coil spring 122, each centrifugal weight 41 receives a force from the cam surface 81 and moves radially inward. Upon movement of each centrifugal weight 41 to an inward position of the cam surface 81, the cam surface 81B of the pressure plate 77 receives a rightward force from the centrifugal weight 41. Then, the pressure plate 77 moves rightward and presses the leftmost first plate 64 rightward. The first and second plates 64 and 65 are thus pressed against each other by the pressure plate 77. As a result, torque transmission between the first and second plates 64 and 65 is enabled, and the resulting transmission torque is greater than zero. The transmission torque obtained in this case is T1 illustrated in FIG. 8.

When the engine rotational speed is increased from zero, centrifugal force is exerted on each centrifugal weight 41, and each centrifugal weight 41 is moved radially outward. Then, the force of each centrifugal weight 41 by which the cam surface 81B is pressed rightward is decreased, and the force of the pressure plate 77 by which the leftmost first plate 64 is pressed rightward is reduced. Therefore, the force by which the first and second plates 64 and 65 are pressed against each other is decreased, and the torque transmittable between the first and second plates 64 and 65 is reduced. When the engine rotational speed r reaches r1, no torque is transmittable between the first and second plates 64 and 65, and the transmission torque T reaches zero (see FIG. 8).

When the engine rotational speed is further increased, each centrifugal weight 41 is moved further radially outward. Each centrifugal weight 41 presses the cam surface 81 rightward, and the cam member 69 is moved rightward. The cam member 69 presses the pressure plate 77 rightward, and the pressure plate 77 presses the leftmost first plate 64 rightward. The first and second plates 64 and 65 are thus pressed against each other by the pressure plate 77. As a result, torque transmission between the first and second plates 64 and 65 is enabled. The higher the engine rotational speed, the greater the force of the pressure plate 77 by which the first plate 64 is pressed, and therefore, the greater the transmission torque between the first and second plates 64 and 65. As illustrated in FIG. 8, the transmission torque T is increased in accordance with an increase in the engine rotational speed r.

When each centrifugal weight 41 is located at a radially outermost position, further radially outward movement of each centrifugal weight 41 is restricted by the cam member 69. Therefore, the force of the pressure plate 77 by which the first plate 64 is pressed is kept constant. Hence, as illustrated in FIG. 8, the transmission torque T between the first and second plates 64 and 65 is held at the constant value Ts when the engine rotational speed r is equal to or higher than rs.

Accordingly, effects similar to those of the first preferred embodiment are also obtainable in the second preferred embodiment.

Note that the transmission torque T1 during engine stoppage can be easily adjusted by changing a spring constant of the coil spring 122, for example. Also in the present preferred embodiment, a braking force applied to the rear wheel 19 during engine stoppage is adjustable.

Third Preferred Embodiment

Figure 13:
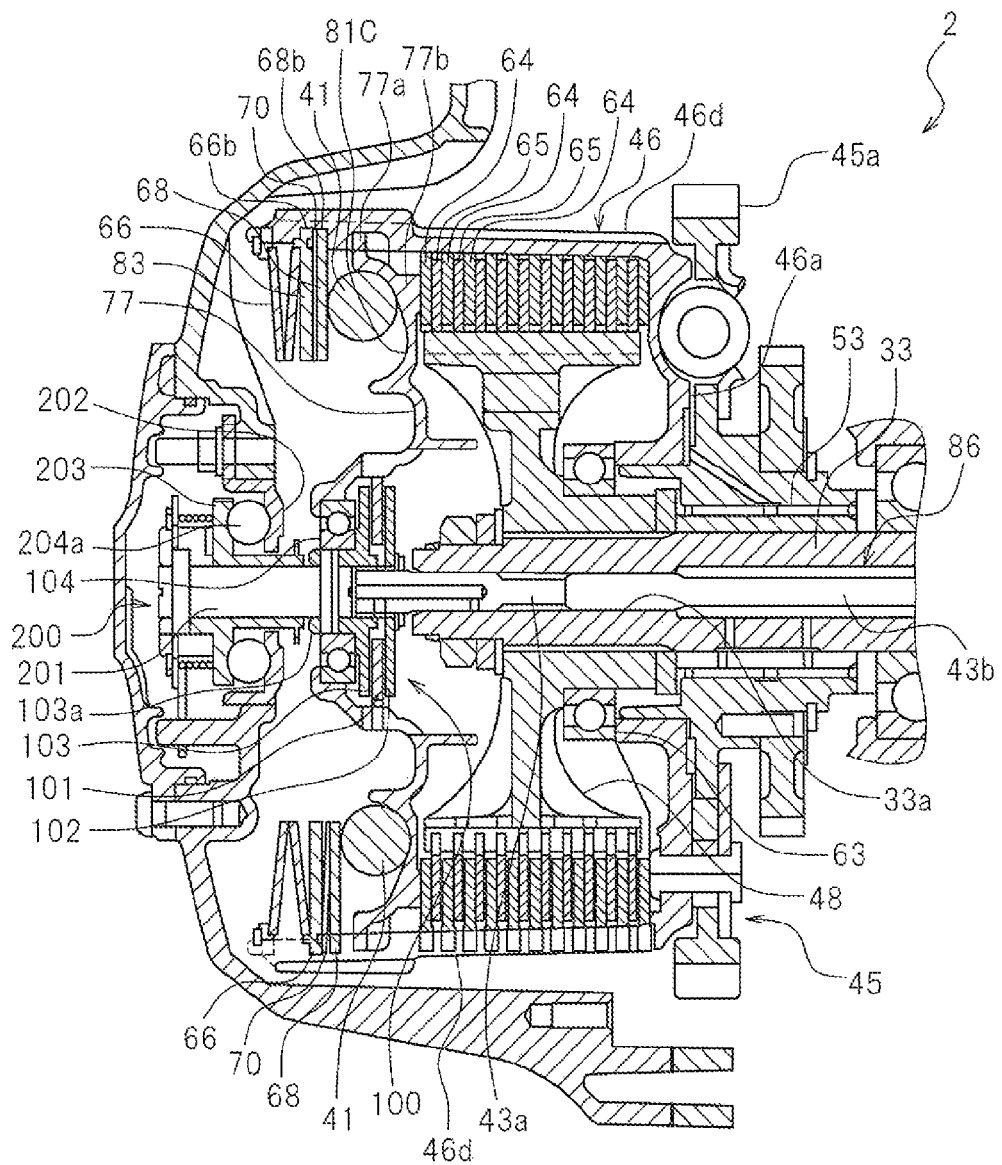
FIG. 13 is a cross-sectional view of a centrifugal clutch according to a third preferred embodiment of the present invention.

FIG. 13 is a cross-sectional view of a centrifugal clutch 2 of a motorcycle 1 according to a third preferred embodiment of the present invention. The centrifugal clutch 2 according to the third preferred embodiment also exhibits characteristics substantially similar to those of the centrifugal clutch 2 according to the first preferred embodiment. In the following description, elements similar to those of the first preferred embodiment are identified by similar reference signs, and detailed description thereof will be omitted.

Figure 14:
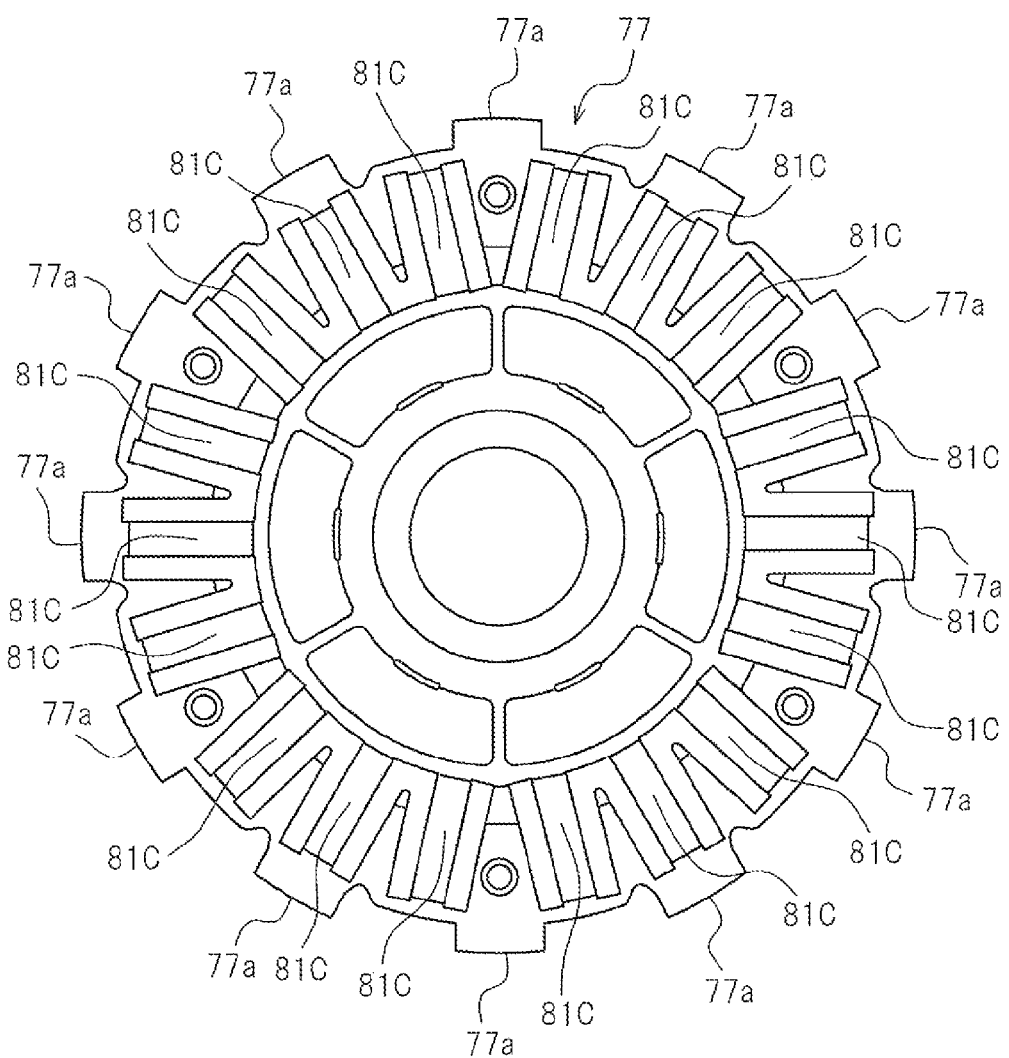
FIG. 14 is a front view of a pressure plate of the centrifugal clutch according to the third preferred embodiment of the present invention.

Also in the third preferred embodiment, a pressure plate 77 is located leftward of first and second plates 64 and 65. Although the pressure plate 77 according to the third preferred embodiment is different in shape from the pressure plate 77 according to the first preferred embodiment, the pressure plate 77 according to the third preferred embodiment is substantially disk-shaped as illustrated in FIG. 14. The pressure plate 77 is provided at its center portion with a sub-clutch 100. Engagement portions 77a for engagement with arms 46d of a clutch housing 46 are provided at a radially outward portion of the pressure plate 77. The pressure plate 77 is provided so as to be movable rightward and leftward with respect to the clutch housing 46. However, the pressure plate 77 is not rotatable with respect to the clutch housing 46 and is rotated together with the clutch housing 46. In the pressure plate 77, there is provided a contact portion 77b that comes into contact with the leftmost first plate 64.

Figure 15:
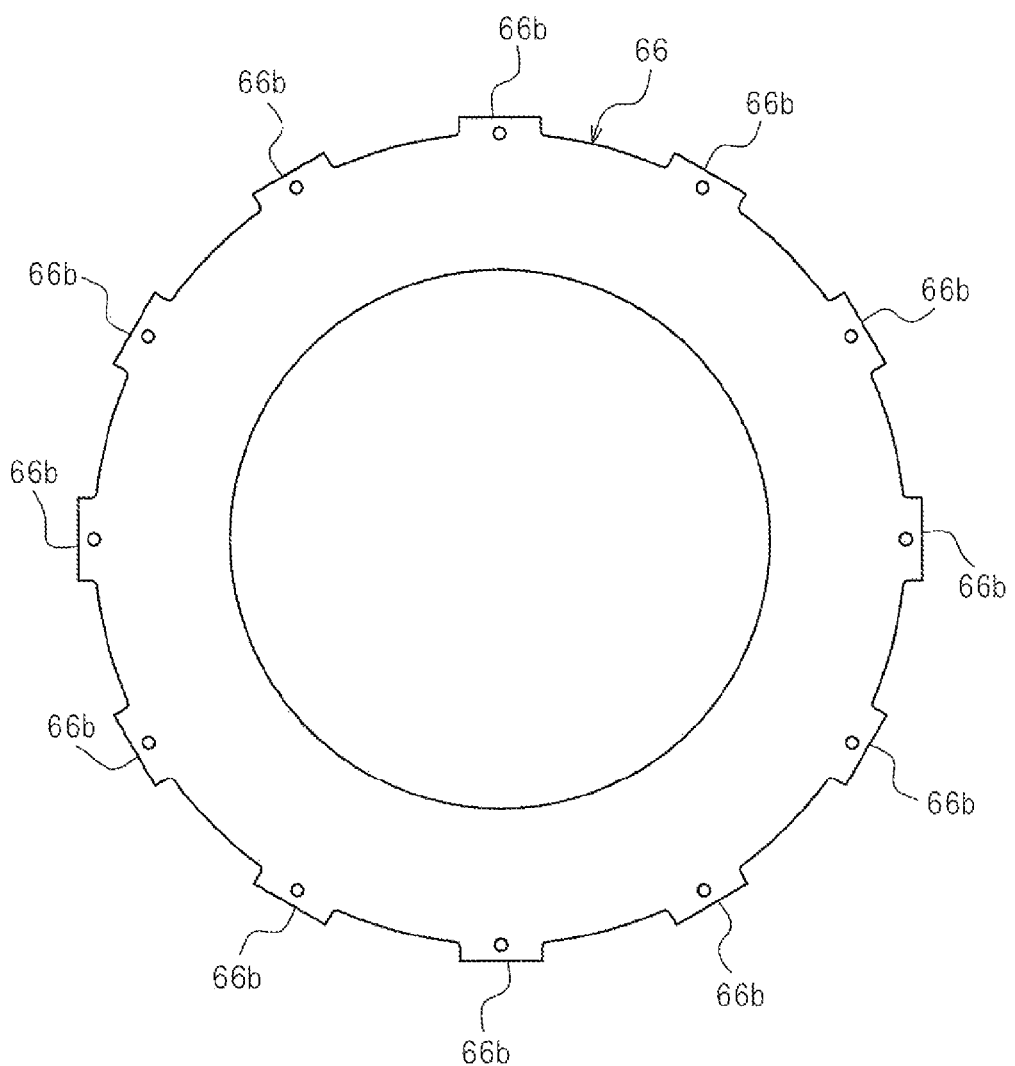
FIG. 15 is a front view of a third plate of the centrifugal clutch according to the third preferred embodiment of the present invention.

A third plate 66 is located leftward of the pressure plate 77. As illustrated in FIG. 15, the third plate 66 has an annular shape. The third plate 66 is located opposite to the locations of the first and second plates 64 and 65 with respect to the pressure plate 77. Radially outward portions 66b of the third plate 66 are supported by the arms 46d of the clutch housing 46. A Belleville spring 83 is provided leftward of the third plate 66.

Figure 16:
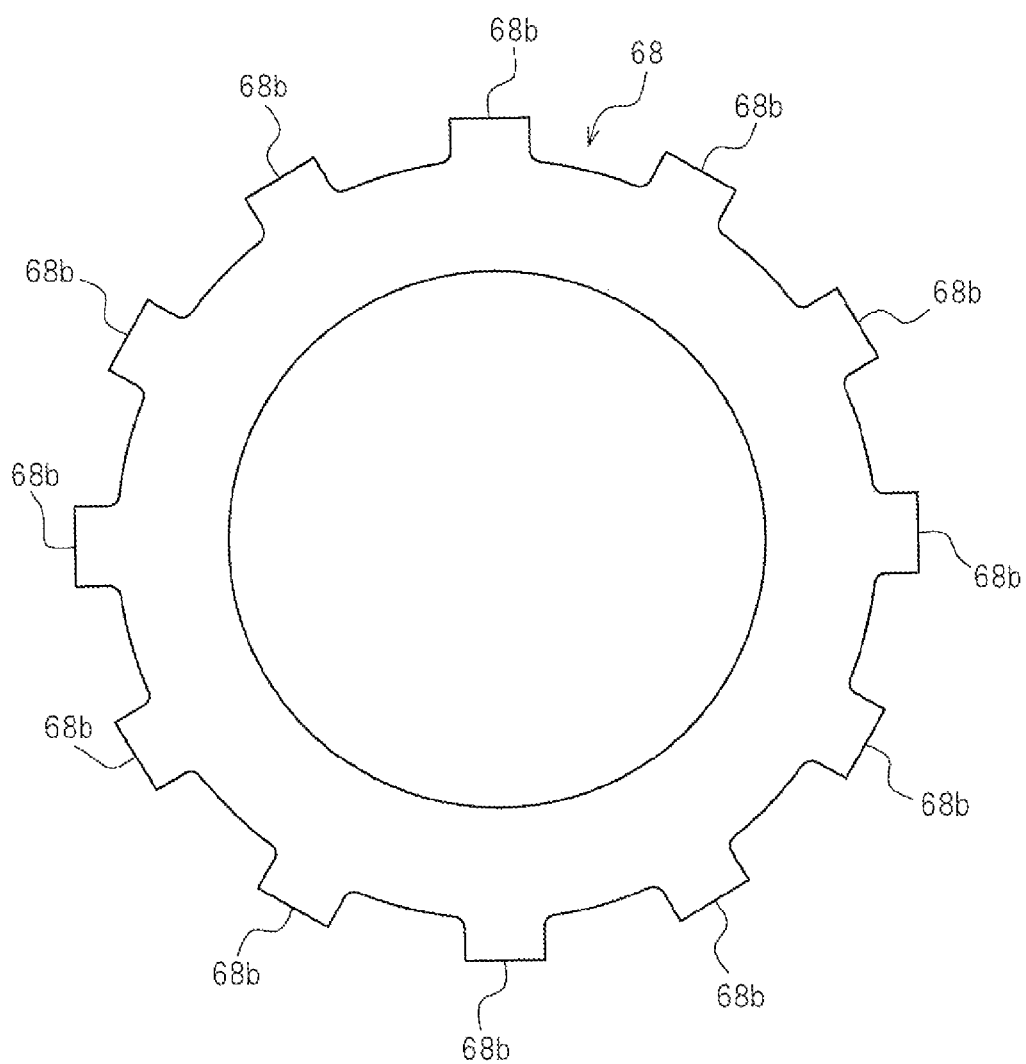
FIG. 16 is a front view of a fourth plate of the centrifugal clutch according to the third preferred embodiment of the present invention.

A fourth plate 68 is disposed between the third plate 66 and the pressure plate 77. As illustrated in FIG. 16, the fourth plate 68 has an annular shape. Radially outer portions 68b of the fourth plate 68 are engaged with the arms 46d of the clutch housing 46. The fourth plate 68 is not rotatable with respect to the clutch housing 46 and is rotated together with the clutch housing 46. However, the fourth plate 68 is movable rightward and leftward with respect to the clutch housing 46.

Figure 17A:
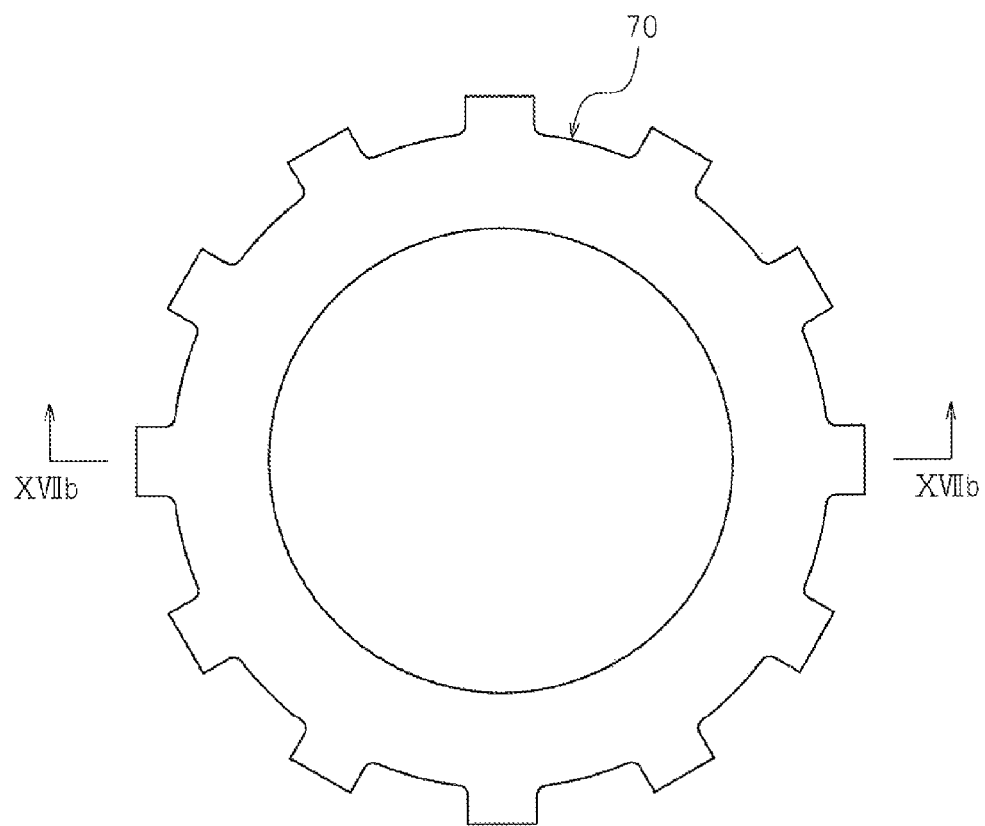
FIG. 17A is a front view of a Belleville spring of the centrifugal clutch according to the third preferred embodiment of the present invention.
Figure 17B:
FIG. 17B is a cross-sectional view taken along the line XVIIb-XVIIb of FIG. 17A.
Figure 17C:
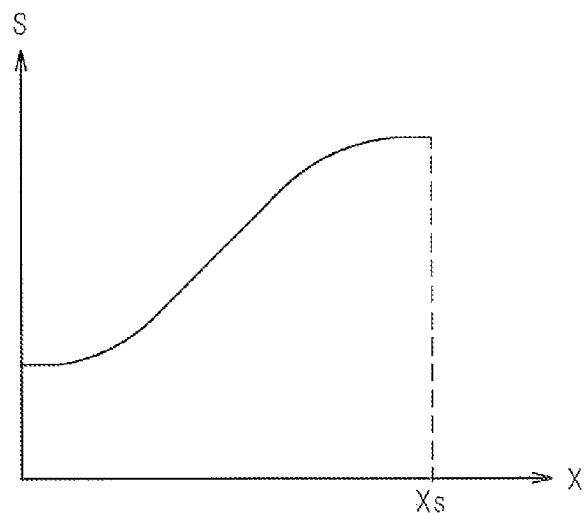
FIG. 17C is a graph illustrating a characteristic curve of the Belleville spring of the centrifugal clutch according to the third preferred embodiment of the present invention.

Between the third and fourth plates 66 and 68, there is located a Belleville spring 70. As illustrated in FIGS. 17A and 17B, the Belleville spring 70 has a substantially annular shape. FIG. 17C is a graph illustrating a characteristic curve of the Belleville spring 70. In FIG. 17C, the horizontal axis represents a height X of the Belleville spring 70 (i.e., a lateral length of the Belleville spring 70), and the vertical axis represents an elastic force S of the Belleville spring 70. Xs in FIG. 17C represents an interval between the third and fourth plates 66 and 68 when the fourth plate 68 is located at a rightmost position. For example, Xs represents a maximum interval between the third and fourth plates 66 and 68. As illustrated in FIG. 17C, the Belleville spring 70 exhibits a characteristic that the elastic force S is reduced as the height X is reduced within the range of X≤Xs. For example, the Belleville spring 70 exhibits a characteristic that the elastic force S is reduced as the amount of deflection of the Belleville spring 70 is increased.

As illustrated in FIG. 13, at a left portion of the pressure plate 77, a cam surface 81C is provided. The cam surface 81C is arranged so that an interval between the cam surface 81C and the fourth plate 68 is increased as the cam surface 81C extends radially inward. The cam surface 81C is inclined rightward as it extends radially inward.

A centrifugal weight 41 is disposed between the cam surface 81C of the pressure plate 77 and the fourth plate 68. A plurality of the cam surfaces 81C are provided at the pressure plate 77, and the centrifugal weight 41 is provided on each cam surface 81C. For example, a plurality of the centrifugal weights 41 are located between the pressure plate 77 and the fourth plate 68. Each centrifugal weight 41 preferably includes a circular cylindrical roller in the present preferred embodiment, but similarly to the first preferred embodiment, for example, the shape of each centrifugal weight 41 is not limited to any particular shape.

Figure 18:
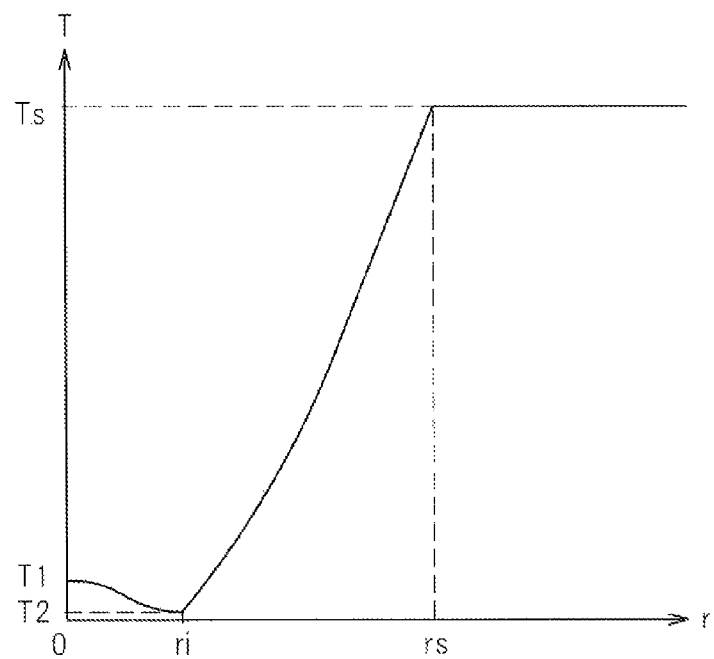
FIG. 18 is a graph illustrating a characteristic curve of the centrifugal clutch according to the third preferred embodiment of the present invention.
Figure 19:
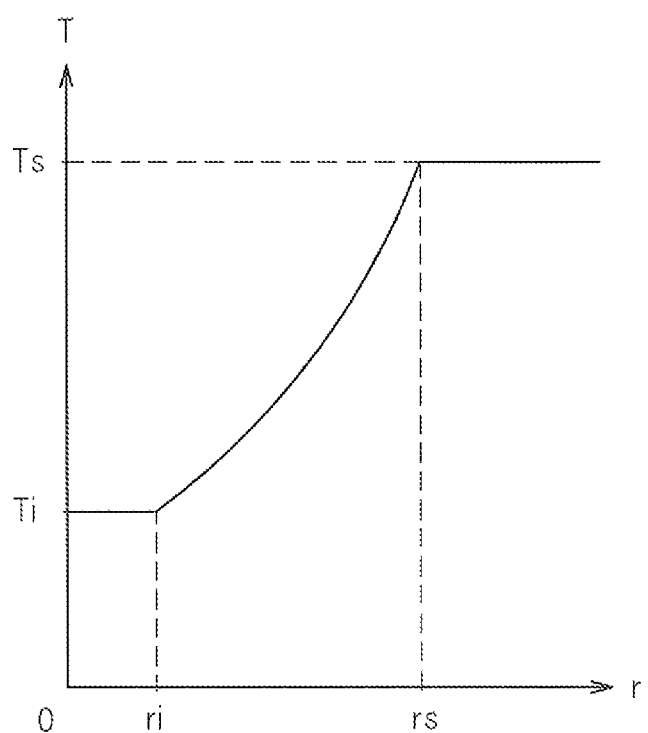
FIG. 19 is a graph illustrating a characteristic curve of a conventional centrifugal clutch.

FIG. 18 is a graph illustrating a characteristic curve of the centrifugal clutch 2 according to the third preferred embodiment. Also in the present preferred embodiment, the transmission torque T is temporarily reduced and then increased as the engine rotational speed r is increased from zero. However, the present preferred embodiment is different from the first and second preferred embodiments in that the minimum value of the transmission torque T is not zero but is a value T2 greater than zero.

When the engine 4 is stopped, substantially no centrifugal force is exerted on each centrifugal weight 41. However, the fourth plate 68 receives a rightward force from the Belleville spring 70, and therefore, the fourth plate 68 presses each centrifugal weight 41 rightward. Then, each centrifugal weight 41 presses the pressure plate 77 rightward, and the first and second plates 64 and 65 are pressed against each other by the pressure plate 77. As a result, torque transmission between the first and second plates 64 and 65 is enabled, and the resulting transmission torque T1 is greater than zero as illustrated in FIG. 18.

When the engine rotational speed is increased from zero, centrifugal force is exerted on each centrifugal weight 41, and each centrifugal weight 41 is moved radially outward. Then, the fourth plate 68 is pressed leftward by each centrifugal weight 41, so that the Belleville spring 70 is compressed and the fourth plate 68 is moved leftward. Upon compression of the Belleville spring 70, the elastic force of the Belleville spring 70 is reduced (see FIG. 17C), thus reducing the force received by the pressure plate 77 from the Belleville spring 70 via the fourth plate 68 and the centrifugal weights 41. Then, the force of the pressure plate 77 by which the leftmost first plate 64 is pressed rightward is decreased. Therefore, the force by which the first and second plates 64 and 65 are pressed against each other is decreased, and the torque transmittable between the first and second plates 64 and 65 is reduced. When the engine rotational speed r reaches ri, the Belleville spring 70 is in the most compressed state, and thus the transmission torque T between the first and second plates 64 and 65 reaches the minimum value T2 (see FIG. 18).

Upon further increase of the engine rotational speed, the centrifugal weights 41 are moved further radially outward. The more radially outward the centrifugal weights 41, the greater the force of the centrifugal weights 41 by which the pressure plate 77 is pressed rightward, and the greater the force of the pressure plate 77 by which the first plate 64 is pressed. Therefore, the higher the engine rotational speed, the greater the force by which the first and second plates 64 and 65 are pressed against each other, and thus the greater the transmission torque between the first and second plates 64 and 65. As illustrated in FIG. 18, the transmission torque T is increased in accordance with an increase in the engine rotational speed r.

Upon movement of each centrifugal weight 41 to a radially outermost position, further radially outward movement of each centrifugal weight 41 is restricted. Therefore, the force of the pressure plate 77 by which the first plate 64 is pressed becomes constant. Hence, when the engine rotational speed r is equal to or higher than rs, the transmission torque T between the first and second plates 64 and 65 is held at the constant value Ts as illustrated in FIG. 18.

Also in the present preferred embodiment, the transmission torque T of the centrifugal clutch 2 is temporarily reduced and then increased as the engine rotational speed r is increased from zero. Therefore, effects substantially similar to those of the first preferred embodiment are also obtainable in the present preferred embodiment.

Also in the present preferred embodiment, the transmission torque T1 during engine stoppage can be easily adjusted by changing a spring constant of the Belleville spring 70, for example. Also in the present preferred embodiment, a braking force applied to the rear wheel 19 during engine stoppage is adjustable.

Other Preferred Embodiments

The centrifugal clutch 2 according to each of the first to third preferred embodiments preferably is a "multiplate centrifugal clutch" in which a plurality of the first plates 64 and a plurality of the second plates 65 are provided and the first and second plates 64 and 65 are alternately arranged. However, the centrifugal clutch according to the present invention is not limited to a multiplate centrifugal clutch. The centrifugal clutch according to the present invention may be a single plate centrifugal clutch including a pair of a first plate and a second plate. However, when the centrifugal clutch according to the present invention is a multiplate centrifugal clutch, the above-described effects are more pronounced than when the centrifugal clutch according to the present invention is a single plate centrifugal clutch.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motorcycle comprising:
   an engine;
   a driving wheel;
   a first power transmission mechanism connected to the engine;
   a second power transmission mechanism connected to the driving wheel; and
   a centrifugal clutch connected to the first and second power transmission mechanisms, the centrifugal clutch including
      a first rotator connected to the first power transmission mechanism;
      a second rotator connected to the second power transmission mechanism;
      a first plate that is provided in the first rotator and that rotates together with the first rotator;
      a second plate that is provided in the second rotator, the second plate facing the first plate and rotating together with the second rotator;
      a pressure plate facing one of the first plate and the second plate, the pressure plate being movable both toward and away from the first and second plates; and
      a centrifugal weight disposed opposite to locations of the first and second plates with respect to the pressure plate, the centrifugal weight pushing the pressure plate toward the first and second plates by receiving centrifugal force;
   wherein the torque transmitted between the first and second plates is temporarily reduced and then increased when an engine rotational speed is increased during an engine operation period following a time period during which the engine is stopped.

2. The motorcycle according to claim 1, wherein the centrifugal clutch further comprises:
   a third plate disposed opposite to the locations of the first and second plates with respect to the pressure plate, the third plate supported by the first rotator;
   a fourth plate disposed between the third plate and the pressure plate;
   a cam member disposed between the third and fourth plates and including a cam surface arranged so that an interval between the cam surface and the fourth plate is increased as the cam surface extends inwardly in a radial direction of the fourth plate; and
   an elastic body that urges the cam member toward the pressure plate;
   wherein the centrifugal weight is disposed between the cam surface of the cam member and the fourth plate.

3. The motorcycle according to claim 1, wherein the centrifugal clutch further comprises:
   a third plate disposed opposite to the locations of the first and second plates with respect to the pressure plate, the third plate supported by the first rotator;

a cam member disposed between the third plate and the pressure plate and including a cam surface arranged so that an interval between the cam surface and the third plate is increased as the cam surface extends inwardly in a radial direction of the third plate; and an elastic body that urges the cam member toward the third plate;

wherein an additional cam surface is provided at the pressure plate so that an interval between the additional cam surface and the third plate is reduced as the additional cam surface extends radially inward; and wherein the centrifugal weight is disposed between the cam surface of the cam member and the third plate and between the additional cam surface of the pressure plate and the third plate.

4. The motorcycle according to claim 1, wherein the centrifugal clutch further comprises:

a third plate disposed opposite to the locations of the first and second plates with respect to the pressure plate, the third plate supported by the first rotator;

a fourth plate disposed between the third plate and the pressure plate; and a Belleville spring located between the third and fourth plates and arranged to urge the fourth plate toward the pressure plate;

wherein a cam surface is disposed at the pressure plate so that an interval between the cam surface and the fourth plate is increased as the cam surface extends inwardly in a radial direction of the fourth plate;

wherein the centrifugal weight is disposed between the cam surface of the pressure plate and the fourth plate; and wherein the Belleville spring exhibits a characteristic that its elastic force is reduced as the amount of deflection of the Belleville spring is increased.

5. The motorcycle according to claim 1, wherein the centrifugal clutch is arranged so that torque transmitted between the first and second plates is temporarily reduced to zero and then increased as the engine rotational speed is increased following a time period during which the engine is stopped.

6. The motorcycle according to claim 1, wherein a plurality of the first plates and a plurality of the second plates are provided, and the first and second plates are alternately arranged.

* * * * *